US012425307B2

(12) United States Patent
Kozlovski et al.

(10) Patent No.: US 12,425,307 B2
(45) Date of Patent: *Sep. 23, 2025

(54) TRANSMITTING REQUEST AND RESPONSE INFORMATION THROUGH DIFFERENT PROXIES

(71) Applicant: Oxylabs, UAB, Vilnius (LT)

(72) Inventors: Miroslav Kozlovski, Vilnius (LT); Arnas Petruskevicius, Vilnius (LT); Valdas Pilkauskas, Vilnius (LT)

(73) Assignee: Oxylabs, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,822

(22) Filed: Apr. 26, 2023

(65) Prior Publication Data
US 2024/0080243 A1    Mar. 7, 2024

Related U.S. Application Data

(63) Continuation of application No. 17/707,682, filed on Mar. 29, 2022, now Pat. No. 11,652,697.

(51) Int. Cl.
*H04L 41/12* (2022.01)

(52) U.S. Cl.
CPC .................................... *H04L 41/12* (2013.01)

(58) Field of Classification Search
CPC ........ H04L 67/288; H04L 67/52; H04L 41/12
See application file for complete search history.

(56) References Cited

U.S. PATENT DOCUMENTS

| | | |
|---|---|---|
| 6,839,761 B2 | 1/2005 | Kadyk et al. |
| 7,127,492 B1 | 10/2006 | Calo et al. |
| 7,493,414 B2 | 2/2009 | Tazuma |
| 7,565,448 B1 | 7/2009 | Schlesener et al. |
| 7,830,896 B2 | 11/2010 | Srivastava |

(Continued)

FOREIGN PATENT DOCUMENTS

| | | |
|---|---|---|
| JP | 6772389 B2 | 10/2020 |
| WO | WO 2018/186824 A1 | 10/2018 |

OTHER PUBLICATIONS

Co-pending U.S. Appl. No. 17/707,682, filed Mar. 29, 2022, entitled "Transmitting Request and Response Information Through Different Proxies," Inventors: Kozlovski et al. (Unpublished).

*Primary Examiner* — Hee Soo Kim

(74) *Attorney, Agent, or Firm* — Sterne, Kessler, Goldstein &Fox, P.L.L.C.

(57) ABSTRACT

Systems and methods to manage and efficiently implement functional proxy services are disclosed. In the proxy services, a single instance of exit-node is connected to at least two or multiple supernodes at any given time. One of the plurality of supernodes is configured to ping and send diagnostic requests to the connected exit-node through a network. The exit-node is directed to send the pong message and diagnostic response data to a different supernode from among the plurality of supernodes connected to the exit-node. Likewise, a client's request is received by an element of the proxy service provider and forwarded to a specific supernode capable of forwarding the client's request to the exit-node. After performing the client's request, the exit-node returns response data to a different supernode from among the plurality of supernodes connected to the exit-node.

20 Claims, 14 Drawing Sheets

(56) References Cited

U.S. PATENT DOCUMENTS

| | | | |
|---|---|---|---|
| 8,631,091 B2 | 1/2014 | Mislove et al. | |
| 9,241,044 B2 * | 1/2016 | Shribman | H04L 67/02 |
| 9,647,871 B2 | 5/2017 | Kohli | |
| 9,742,866 B2 | 8/2017 | Shribman et al. | |
| 10,257,319 B2 | 4/2019 | Shribman et al. | |
| 10,455,030 B2 | 10/2019 | Maslak et al. | |
| 10,469,614 B2 | 11/2019 | Shribman et al. | |
| 10,484,510 B2 | 11/2019 | Shribman et al. | |
| 10,484,511 B2 | 11/2019 | Shribman et al. | |
| 10,637,968 B2 | 4/2020 | Shribman et al. | |
| 10,873,647 B1 | 12/2020 | Pilkauskas et al. | |
| 11,044,344 B2 | 6/2021 | Shribman et al. | |
| 11,196,833 B1 * | 12/2021 | Norbutas | H04L 63/0272 |
| 11,388,253 B1 * | 7/2022 | Suckel | H04L 43/55 |
| 2007/0283023 A1 * | 12/2007 | Ly | H04L 67/56 |
| | | | 709/227 |
| 2010/0030880 A1 * | 2/2010 | Joshi | H04L 67/1001 |
| | | | 709/223 |
| 2019/0342417 A1 * | 11/2019 | Gerdfeldter | H04L 69/28 |
| 2020/0412826 A1 * | 12/2020 | Levy Nahum | H04L 69/16 |
| 2022/0337670 A1 * | 10/2022 | Pilkauskas | H04L 67/61 |

* cited by examiner

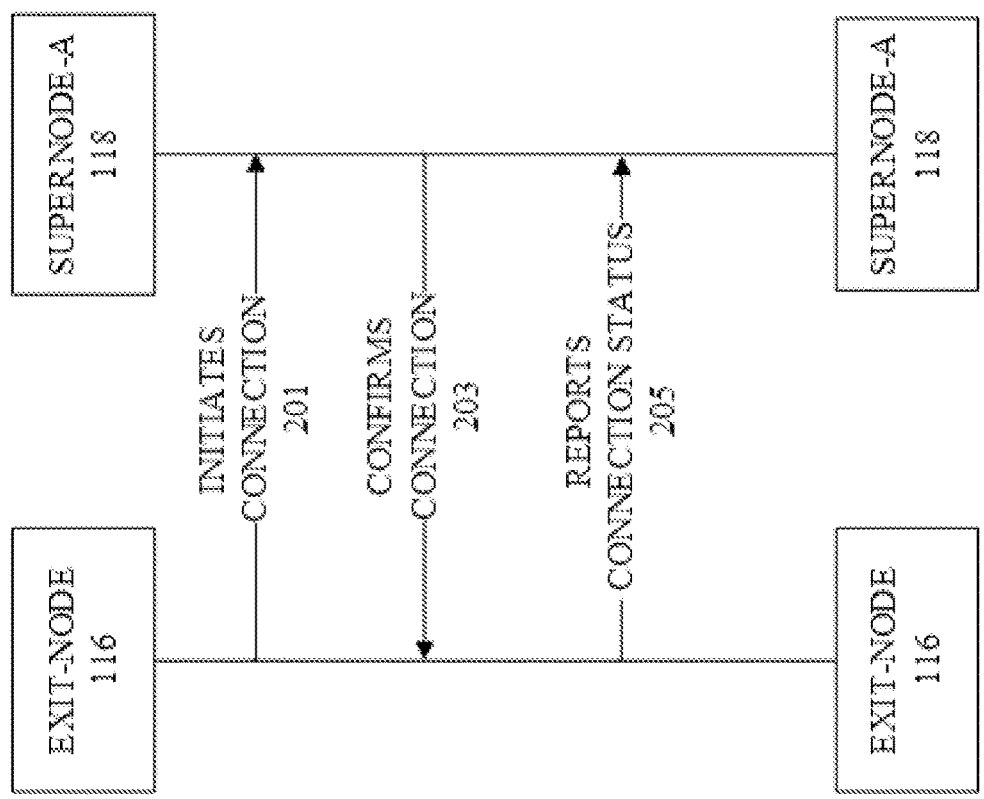

TRANSMITTING REQUEST AND RESPONSE INFORMATION THROUGH DIFFERENT PROXIES

CROSS REFERENCE TO RELATED APPLICATIONS

This application is a continuation of U.S. application Ser. No. 17/707,682, filed Mar. 29, 2022 (now pending), the disclosure of which is incorporated by reference herein in its entirety.

FIELD

The disclosure belongs to the field of proxy servers and proxy technology. Methods and systems disclosed herein are, in general, directed to enable a sophisticated and functional implementation of proxy services to multiple proxy clients.

BACKGROUND

In computer technology, a proxy server is a computer system or a server application instance that acts as an intermediary for requests from clients seeking resources from other servers (for example, web servers). A client connects to a proxy server requesting data or service from a target server, available over a network (e.g., Internet). The proxy server forwards the request to the target server containing the necessary data or providing the requested services. In addition, the proxy server replaces the client's IP address with its IP address in the forwarded request. As a result, the proxy server appears as the source address of the forwarded request to the target server.

In simple terms, instead of connecting directly to a server that can provide a requested resource, such as a file or a webpage, the client directs to a proxy server, which evaluates the request and performs the required network transactions. Proxies serve as a method to simplify or control the complexity of the request or provide additional benefits such as load balancing, privacy and security. In some instances, proxy servers are designed to add structure and encapsulation to distributed systems. A proxy server thus functions on behalf of the client when requesting service, potentially masking the true origin of the request to the resource server.

Most proxy servers are employed to access content on the World Wide Web, provide anonymity, and circumvent geo-restrictions. Additionally, many organizations employ proxy servers to maintain better network performance. Proxy servers can cache common web resources—so when a client requests a particular web resource, the proxy server will check to see if it has the most recent copy of the web resource and then sends the client the cached copy. The above-described implementation can reduce latency and improve overall network performance to a certain extent.

Proxies are commonly classified based on two categories: a) based on routing pattern; b) based on operational protocol. On the basis of routing pattern, proxies are further classified into the following: i) Forward proxies—these proxies are proxy servers that route traffic between the client(s) and another system, usually external to the network. By doing so, forward proxies can regulate traffic according to preset policies, convert and mask client IP addresses, enforce security protocols and block unknown traffic. Systems with shared networks, such as business organizations or data centers, often use forward proxy servers. It should be mentioned that forward proxies expose a single interface with which clients interact without enforcing all of the policies and route management logic within the clients themselves. ii) Reverse proxies—a reverse proxy is a proxy server that accepts requests from clients, forwards the requests to another one of many servers, and returns the result from the server that actually processed the request to the client. A forward proxy server allows multiple clients to route traffic to an external network. For instance, a business may have a proxy that routes and filters employees traffic to the public Internet. On the other hand, a reverse proxy routes traffic on behalf of multiple servers. Moreover, a reverse proxy effectively serves as a gateway between clients, users and application servers. It handles all the access policy management and traffic routing, and it protects the server's identity that actually processes the client's request.

Likewise, on the basis of operational protocol, proxies are further classified as i) SOCKS proxy—these types of proxy servers create a TCP (Transmission Control Protocol) connection to another server behind the firewall on the client's behalf and exchanges network packets between the client and the actual server. SOCKS proxy servers are often used in situations when clients are behind a firewall and are not permitted to establish TCP connections to outside servers unless they do it through the SOCKS proxy server. Therefore, a SOCKS proxy relays a user's TCP and User Datagram Protocol (UDP) session over a firewall. The term SOCKS stands for Socket Secure which is a network protocol that facilitates communication with servers through a firewall by routing network traffic to the actual server on behalf of a client. SOCKS is a layer 5 protocol and therefore, the SOCKS proxies can handle several request types, including HTTP, HTTPS, POP3, SMTP and FTP. As a result, SOCKS can be used for email, web browsing, peer-to-peer sharing and more. ii) HTTP proxy—the term HTTP stands for Hypertext Transfer Protocol, the foundation for any data exchange on the Internet. HTTP proxy can act as a high-performance proxy content filter. Similar to other proxies, HTTP proxy works as an intermediary between the client browser and the destination web server. HTTP proxy can save much bandwidth through web traffic compression, caching of files and web pages from the Internet. Here, bandwidth refers to the amount of data that can be transferred from one point to another within a network in a specific amount of time. Typically, bandwidth is expressed as a bitrate and measured in bits per second (bps). HTTP proxy is a feasible option for companies that need to access ad-heavy websites. Furthermore, HTTP proxies allow many users to utilize the connection concurrently, making HTTP proxies useful for companies with a large number of employees. In short, HTTP proxies can be understood as an HTTP tunnel, i.e., a network link between devices with restricted network access. iii) FTP proxy—the term FTP refers to one of the protocols used to move files on the Internet. The term FTP stands for File Transfer Protocol. In FTP, a control connection is used to send commands between an FTP client and an FTP server. However, the file transfers occur on a separate connection called the data connection. The FTP proxy can offer enhanced security for uploading files to another server. Moreover, the FTP proxy typically offers a cache function and encryption method, making the transmission process secure and safe from hackers.

A proxy server has several purposes and uses cases, including, but not limited to: (i) proxies are used to keep the clients anonymous, mainly for security reasons; (ii) proxy servers are employed to speed up access to network resources; (iii) proxies can be an efficient way to implement access policy to network services or content, e.g., to block specific web domains; (iv) proxy servers may be used to provide employee Internet usage reporting; (v) proxy servers are suitable for circumventing geo-restrictions and Internet filtering to access content otherwise blocked by authoritarian government policies; (vi) proxies, in some instances, may be used to scan transmitted content for malware before delivery to the clients; (vii) proxies can be employed to prevent data leakages.

To elaborate further, modern proxy servers do much more than simply forward web requests. Proxy servers act as a firewall and web filter, provide shared network connections, and cache data to speed up common requests. Proxy servers can provide a high level of privacy. Proxy servers can also be used to control the internet usage of employees and children (e.g., organizations and parents set up proxy servers to control and monitor how their employees or kids use the Internet) or improve browsing speed and save bandwidth. Proxies can be used to bypass certain Internet restrictions (e.g. firewalls) by enabling a user to request the content through a (remote) proxy server instead of accessing the content directly. Proxy servers are often used to get around geo-IP based content restrictions. If someone wants to get content from, for example, a US webpage, but they do not have access from their home country, they can make the request through a proxy server that is located in the USA (and has a US IP address). Using proxy services, the user's traffic seems to be coming from the USA IP address. Proxies can also be used for web scraping, data mining, and other similar tasks.

In computers and networking, a protocol is a set of rules that specify how, for instance, two devices can communicate with each other. The Internet uses many different protocols that determine every aspect of its operation. Without these rules (i.e., protocols), disparate devices would have no means to communicate with each other. TCP/IP stands for Transmission Control Protocol/Internet Protocol. TCP/IP is a set of standardized rules (or protocols) that enables computer systems to communicate on networks such as the Internet. TCP/IP breaks each message into packets, and those packets are then reassembled on the other receiving node/system. Each packet could take a different route to the other (i.e., receiving) node/system if the first route is unavailable or congested. In addition, TCP/IP divided the different communication tasks into four 'conceptual layers' in order to standardize the communication process.

The User Datagram Protocol or UDP is another communication protocol used across the Internet for especially time-sensitive transmissions such as video playback or DNS lookups. UDP speeds up communications by not formally establishing a connection before data is transferred. UDP allows data to be transferred very quickly, but it can also cause packets to become lost in transit. Therefore, UDP may create opportunities for exploitation of the communication channels in the form of DDoS attacks. UDP is faster but less reliable than TCP. In a TCP communication, two computers begin by establishing a connection via an automated process called a 'handshake'. Only after the 'handshake', the computers will be able to communicate with each other. However, UDP communications do not carry out the initial 'handshake' process. Instead, one computer can simply begin sending data to another in a UDP communication.

Domain Name System (DNS) is one of the foundations of the Internet. The DNS is the hierarchical and decentralized naming system used to identify computers, services, and other resources reachable through the Internet or other Internet protocol (IP) networks. In simple terms, DNS is a directory of names that match with the IP addresses of computers or systems or network nodes. Hence, DNS can be considered as the 'phonebook' of the Internet. DNS is responsible for finding the right IP address for domains to which clients are intending to access. For instance, when a client provides a specific domain name, the DNS server is responsible for looking up the right IP address associated with the particular domain name. The browser of the client then uses the found IP address to communicate with the target server hosting the particular domain.

In computer networking, load balancing is the process of distributing network traffic across more than one server to improve performance and availability. Many organizations use different forms of load balancing to improve network performances. One must understand that without load balancing, most Internet applications and websites would not handle network traffic effectively or function correctly. DNS-based load balancing is a type of load balancing that uses the DNS to distribute network traffic across several servers. DNS-based load balancing is realized by providing alternative IP addresses in response to the client's DNS queries. Load balancers can use various methods or rules for choosing IP addresses for a DNS query.

An important foundation of computer networking is the Application Programming Interface (API). An API allows server administrators or computer programmers to access functionalities of published software modules and services on the web. APIs play a vital role in application development and network programming. To elucidate further, an API defines data structures and subroutines that extend existing applications with new features. APIs are also used to build new applications on top of several software components. Certain APIs support network programming. Here, the term network programming refers to a type of software development for applications that connect and communicate over computer networks, including the Internet. APIs provide entry points to protocols and reusable software libraries. Network APIs support web browsers, web databases and many mobile applications. Thus, APIs can be simply understood as a service/system that simplifies software development and innovation by enabling applications to exchange data and functionality easily and securely.

Furthermore, APIs offer security by design. In most instances, an API request or a call includes authorization credentials to minimize the risk of suspicious attacks on the server, and an API gateway can always limit access to reduce security risks and threats. For example, an API offered by a payment processing service. In such cases, clients may enter their bank details on the front-end of an application for an e-commerce website. The payment processor does not require access to the client's bank account, therefore, the API may create a unique token for the particular transaction and may include the token in the API call to the server. Thus, APIs can ensure a high level of security against potential hacking threats.

In recent years, most application programming interfaces are web APIs that expose an application's data and functionality over the Internet. The four main types of web API are: a) Open APIs; b) Partner APIs; c) Internal APIs; d) Composite APIs. As the utilization of web APIs has increased, certain protocols have been developed to provide clients with a set of defined rules that dictates the accepted data types and commands. Some predominantly used API protocols are: a) SOAP (Simple Object Access Protocol); b) XML-RPC; c) JSON-RPC; d) REST (Representational State Transfer).

Now, returning to the subject of proxy servers, it must be noted that there are four types of proxy servers based on IP address—residential, datacentre, mobile and ISP proxies. A residential proxy is an IP address from the range designated explicitly by the owning party assigned to private customers. Usually, a residential proxy is an IP address linked to a physical device, for example, a mobile phone or desktop computer. However, businesswise, the blocks of Residential IP addresses may be bought from the owning Proxy Service Provider by another company directly, in bulk. The real owners of the Residential IP address ranges, namely Internet service providers (ISPs), register residential IP addresses in public databases, allowing websites to determine a device's internet provider, network, and location. Residential proxies are broadly categorized into two sub-divisions—static residential proxies and rotating residential proxies. Static residential proxies mask clients' actual IP addresses behind a single IP address. On the contrary, rotating residential proxies mask clients' actual IP addresses behind a pool of IP addresses that constantly rotates or changes over time. IP addresses of the rotating residential proxies may belong to different subnets connected with an advanced global IP address network. Most data collection businesses prefer rotating residential proxies over static residential proxies.

Following the residential proxies, data-center proxies are IP addresses owned by Local Internet Registries (LIRs) such as, but not limited to, web hosting companies and Universities. Data-center proxies are not affiliated with any Internet Service Providers (ISPs). In general, data-center proxies are known for their exceptional performance, speed and cost-effectiveness. One of the differences between residential and data-center proxies is that the latter are owned by companies or organizations and not by individuals. Data-center proxies may be subdivided into private data-center proxies, public data center proxies, and shared data center proxies. Private data-center proxies, also known as dedicated data-center proxies, are IP addresses employed in a specific timeframe or a particular domain. Dedicated data-center proxies are extremely useful in online data collection operations. Public data center proxies are generally free proxies useful only for fundamental requirements like disguising a client's geo-location to circumvent geo-restriction over the Internet. Likewise, shared data-center proxies are usually shared by several individuals or companies simultaneously. Small businesses with financial constraints may employ shared datacentre proxies.

Mobile proxy servers are another type of proxy server classified based on IP addresses. Mobile proxies are IP addresses with network connections assigned to clients by mobile carriers. Mobile proxies are available on portable devices like smartphones or tablets with Internet connections through mobile data. Yet another type of proxy server is the ISP proxy server. The ISP proxy servers are proxies with both residential and data-center attributes. ISP proxies are supported by an ISP to assign an IP address to the client but are hosted on a datacentre's servers. ISP proxies are configured to aid clients with multiple use cases like residential proxies without compromising performances like datacentre proxies.

Exit-node proxies, or simply exit-nodes, are last-mile proxies through which clients' requests reach the Internet. One must be aware that there may be several proxies used to perform a client's request, but the exit-node proxy is the final proxy that contacts the target and forwards the information from the target to the queue to reach the client. In the current embodiments, proxies and exit nodes can be used as synonyms. The current embodiments are not limited only to the exit nodes and the same technologies can be used for the proxies. However, the term exit node is employed in the current description to clarify the technical differences between exit nodes and proxies. Inherently the exit node device is external to the proxy service provider infrastructure, usually belonging to a private customer e.g. a smartphone, a computer, a TV, or another Internet-enabled electronic device.

In general, there can be significant challenges associated with proxies and proxy services. Not every proxy service provider can offer reliable and efficient proxy services, and maintaining a highly distributed network of proxy servers can be an arduous undertaking. Proxy service providers may require immense technological expertise and other resources in order to deploy successful services to their multitudinous clients from around the world. For example, proxy service providers must be able to offer proxies with high availability and minimal response latency. In computer networking, latency is a measure of delay. Latency is usually measured as a round trip delay—the time taken for information to get to its destination and back again. Further, competence to handle high network traffic (for instance, over a million requests per day), systems and methods to support a quick crash recovery and robust infrastructure to deploy reliable proxy services are some of the pivotal features in building an efficient proxy service infrastructure.

Ergo, proxy service providers continuously seek cost-effective and innovative solutions to meliorate and revamp their proxy service infrastructures. The embodiments of the current disclosure aim to provide certain sophistication and functionalities to build and operate a reliable and robust proxy service infrastructure.

A person of ordinary skills in the art will appreciate that the discussion above is merely provided for general background information and is not intended to define or categorize the scope of the claimed subject matter.

SUMMARY

The summary provided herein presents a general understanding of the exemplary embodiments disclosed in the detailed description accompanied by drawings. Moreover, this summary is not intended as an extensive or exhaustive overview. Instead, the only purpose of this summary is to present the condensed concepts related to the exemplary embodiments in a simplified form as a prelude to the detailed description.

The present embodiments feature systems and methods to implement and provide a sophisticated and functional proxy service environment to multiple proxy clients irrespective of their geo-location. Particularly, in the current embodiments, exit-nodes can connect and maintain network connections with multiple or at least two supernodes concurrently. Furthermore, one of the plurality of connected supernodes can forward network traffic (e.g., requests originated from one or more client devices) to the exit-node. The exit-node can return the response traffic to a different supernode from the plurality of connected supernodes in response to the forwarded network traffic. In short, the response traffic is not returned to the supernode that initially forwarded the network traffic to the exit-node. Instead, the exit-node returns the response traffic to a different supernode. Hence, by implementing the current embodiments, a proxy service provider may improve the following, but not be limited to, network load handling, load balancing administration, client experience, speed and reliability in processing clients' requests, and overall reliability of proxy services. Additionally, implementation of the current embodiments provides systems and methods to route the network traffic within a proxy environment efficiently.

BRIEF DESCRIPTION OF DIAGRAMS

FIGS. 2A-2B is an exemplary sequence diagram showing exit-node 116 connecting with multiple supernodes.

Figure 4A:
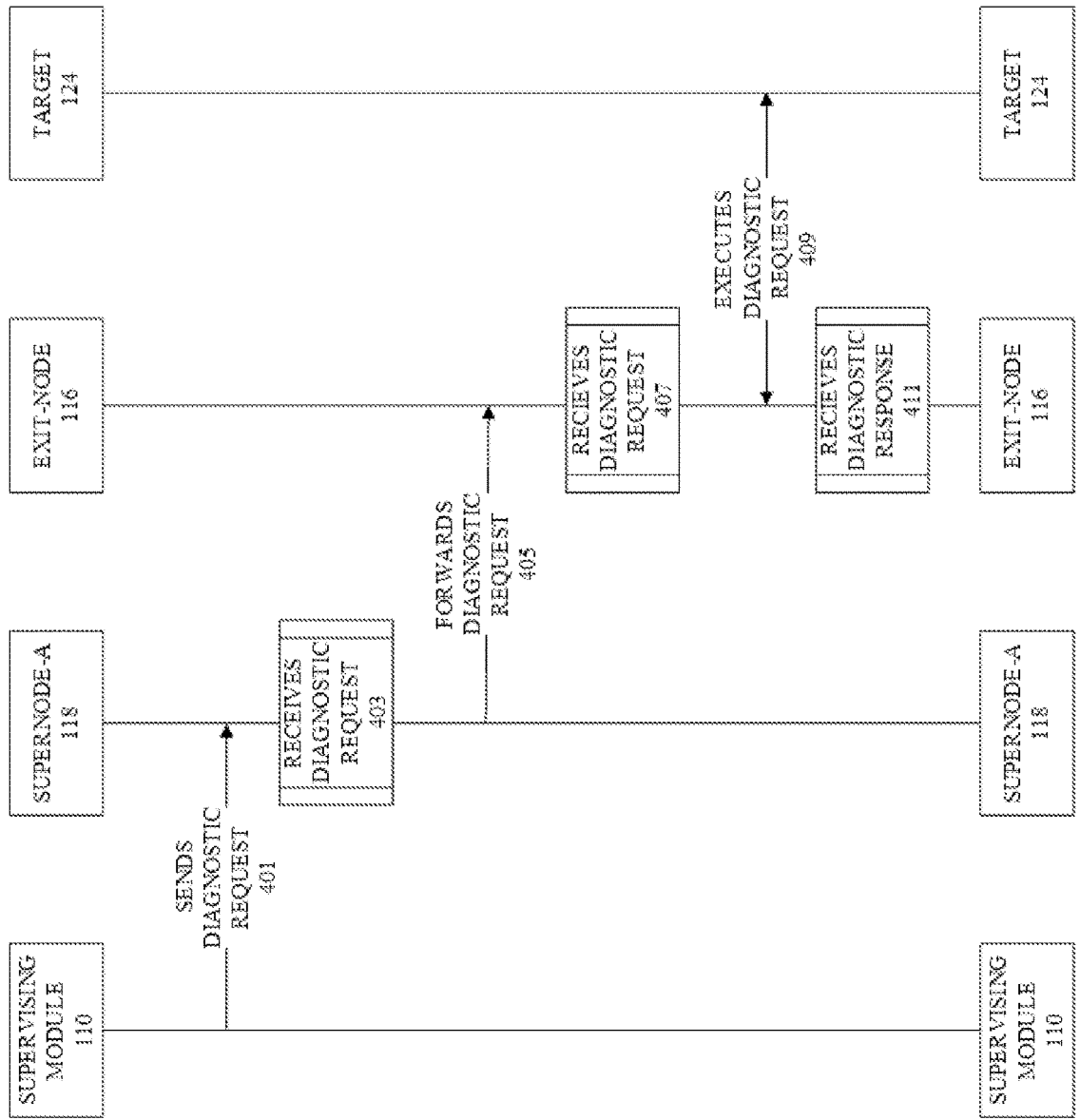
Figure 4B:
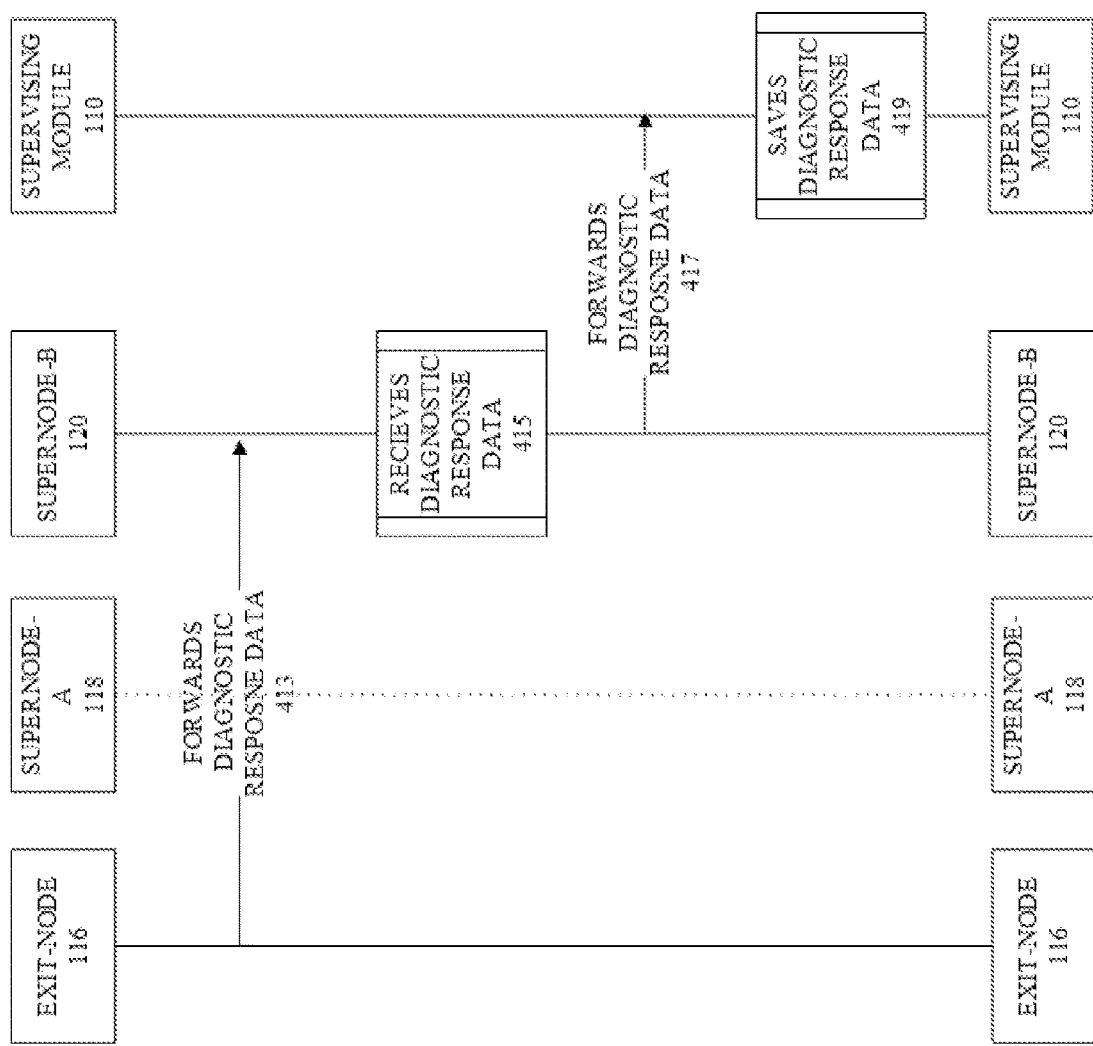

FIGS. 4A-4B is an exemplary sequence diagram showing supervising module 110 sending a diagnostic request to exit-node 116 via one of the supernodes among the plurality of supernodes connected to exit-node 116.

Figure 5:
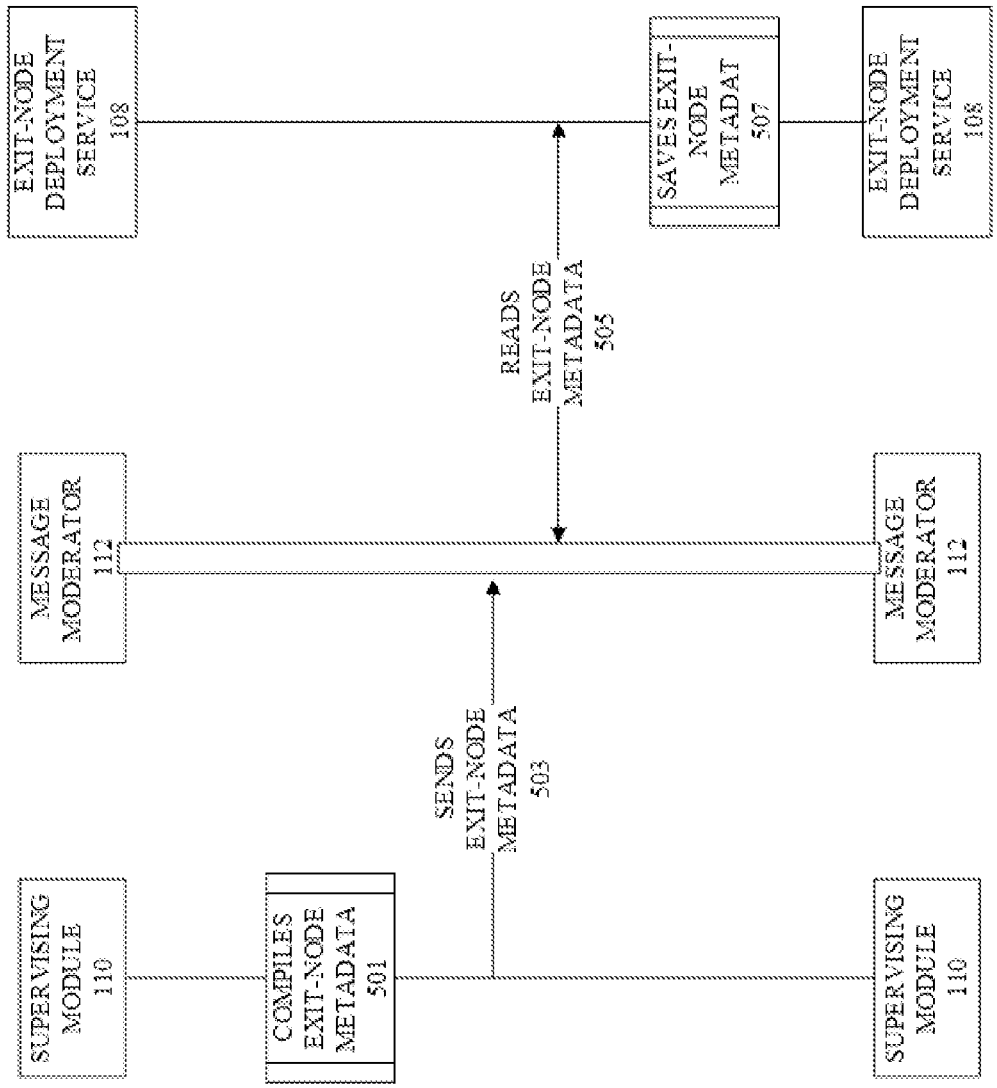

FIG. 5 is an exemplary sequence diagram showing supervising module 110 compiling or putting together the metadata of exit-node 116 and sending the metadata of exit-node 116 to message moderator 112.

Figure 6A:
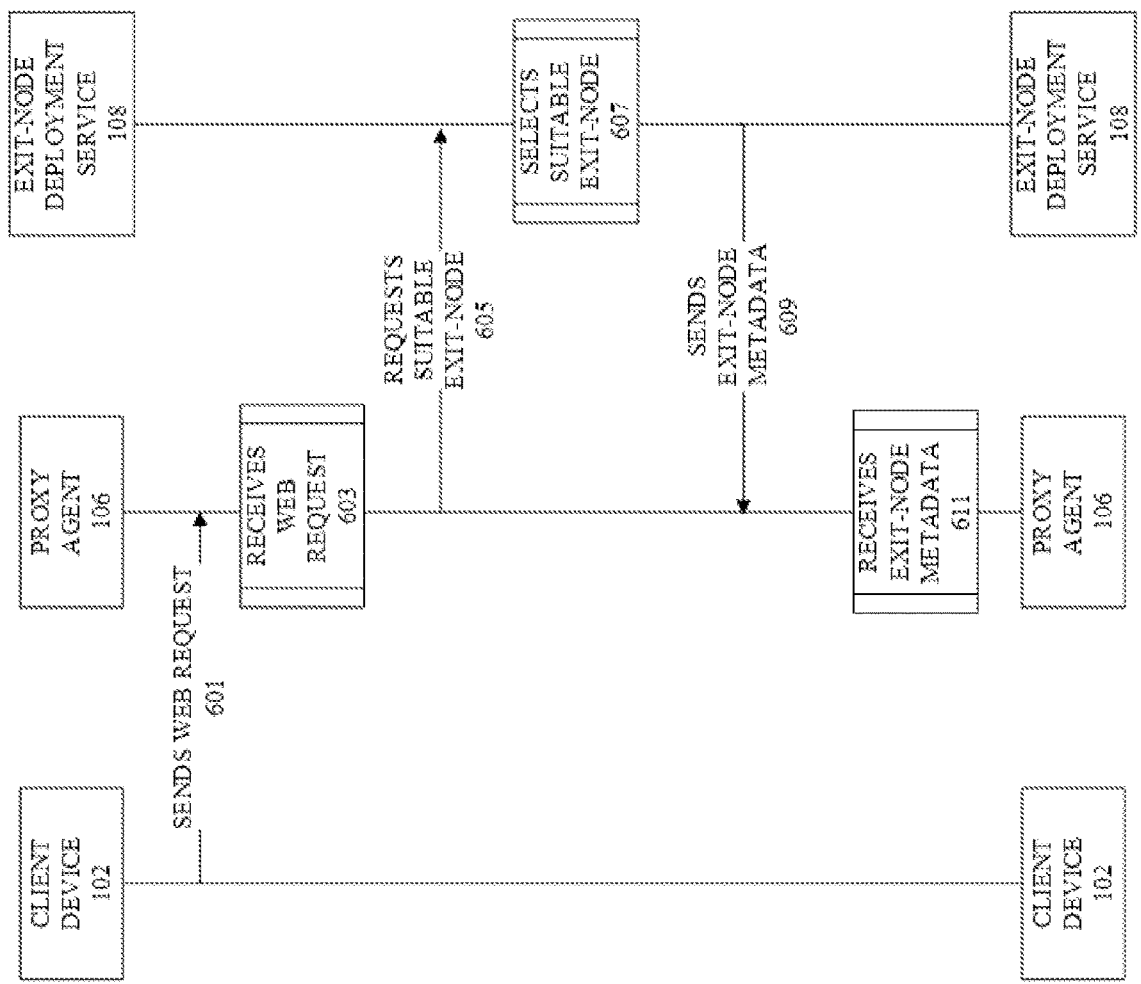
Figure 6B:
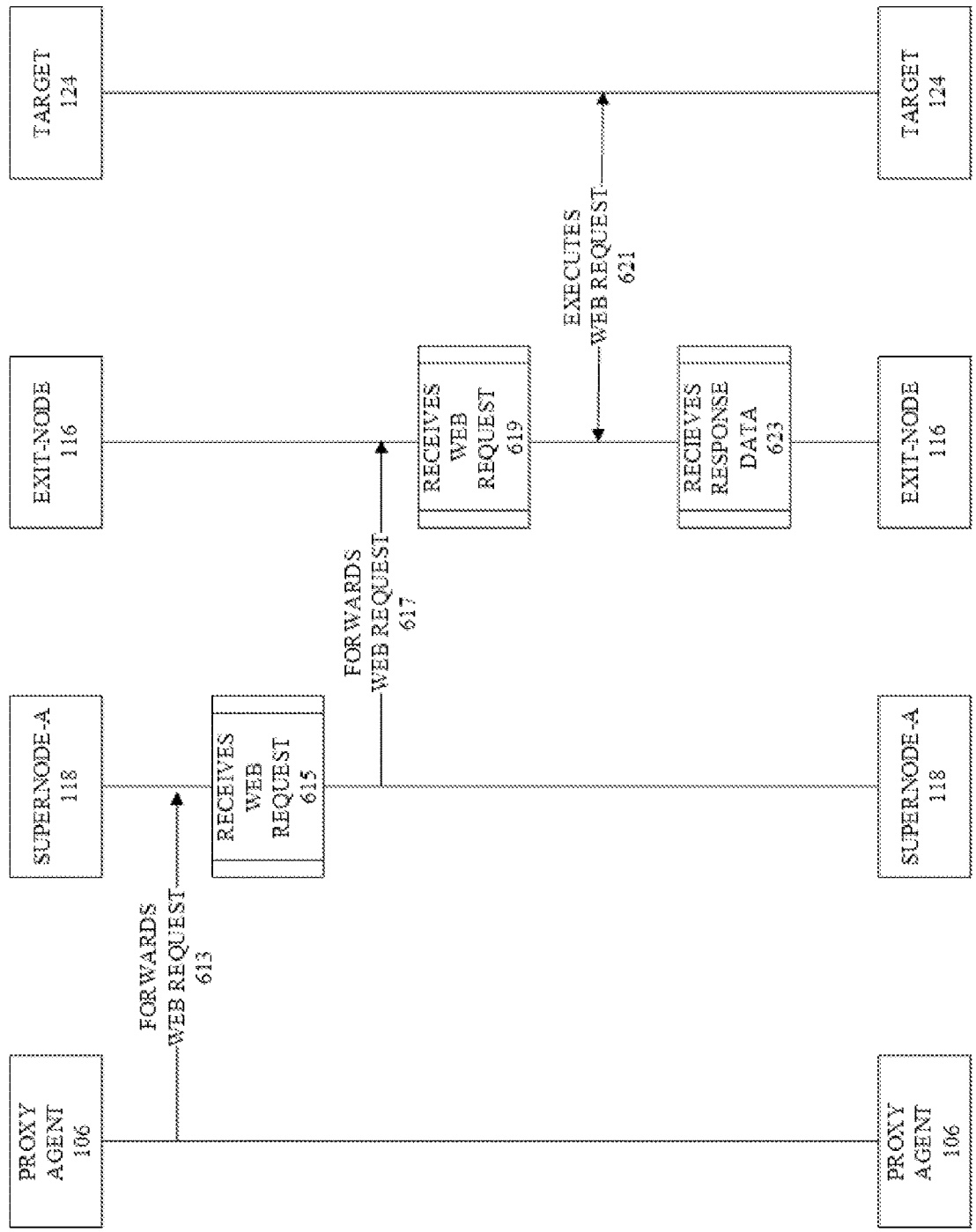
Figure 6C:
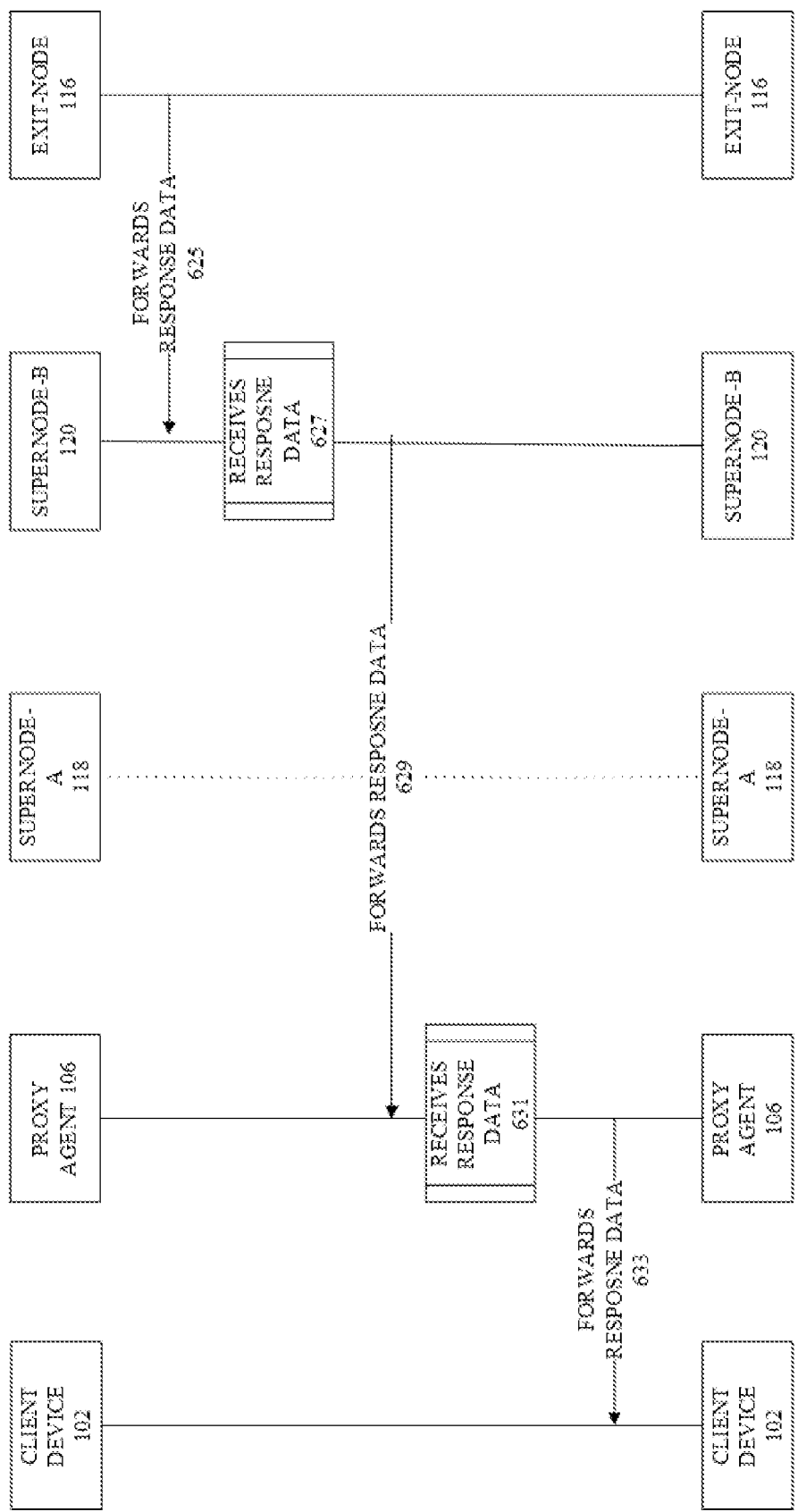

FIGS. 6A-6C is an exemplary sequence diagram showing the execution of a web request received from client device 102.

Figure 7A:
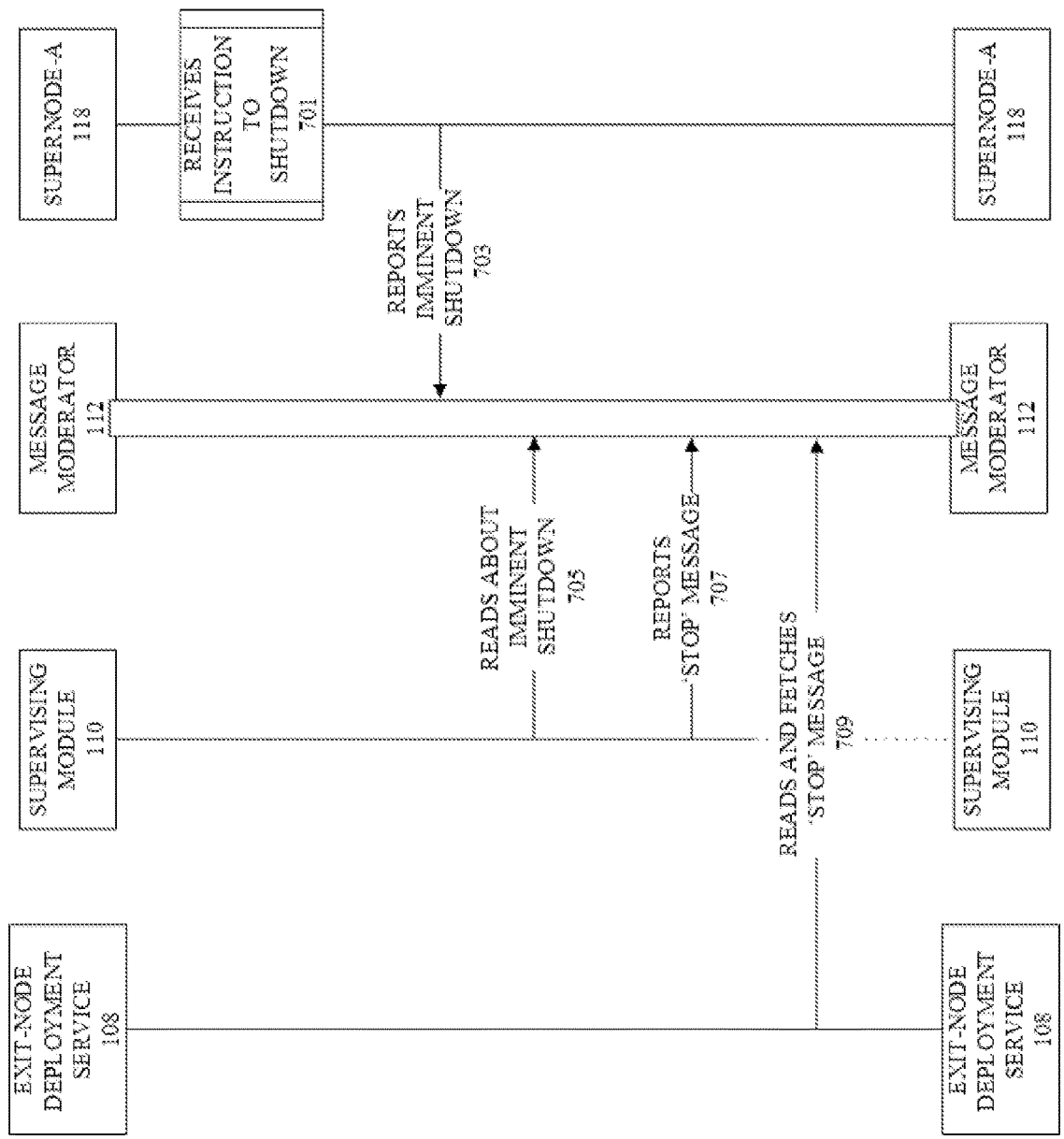
Figure 7B:
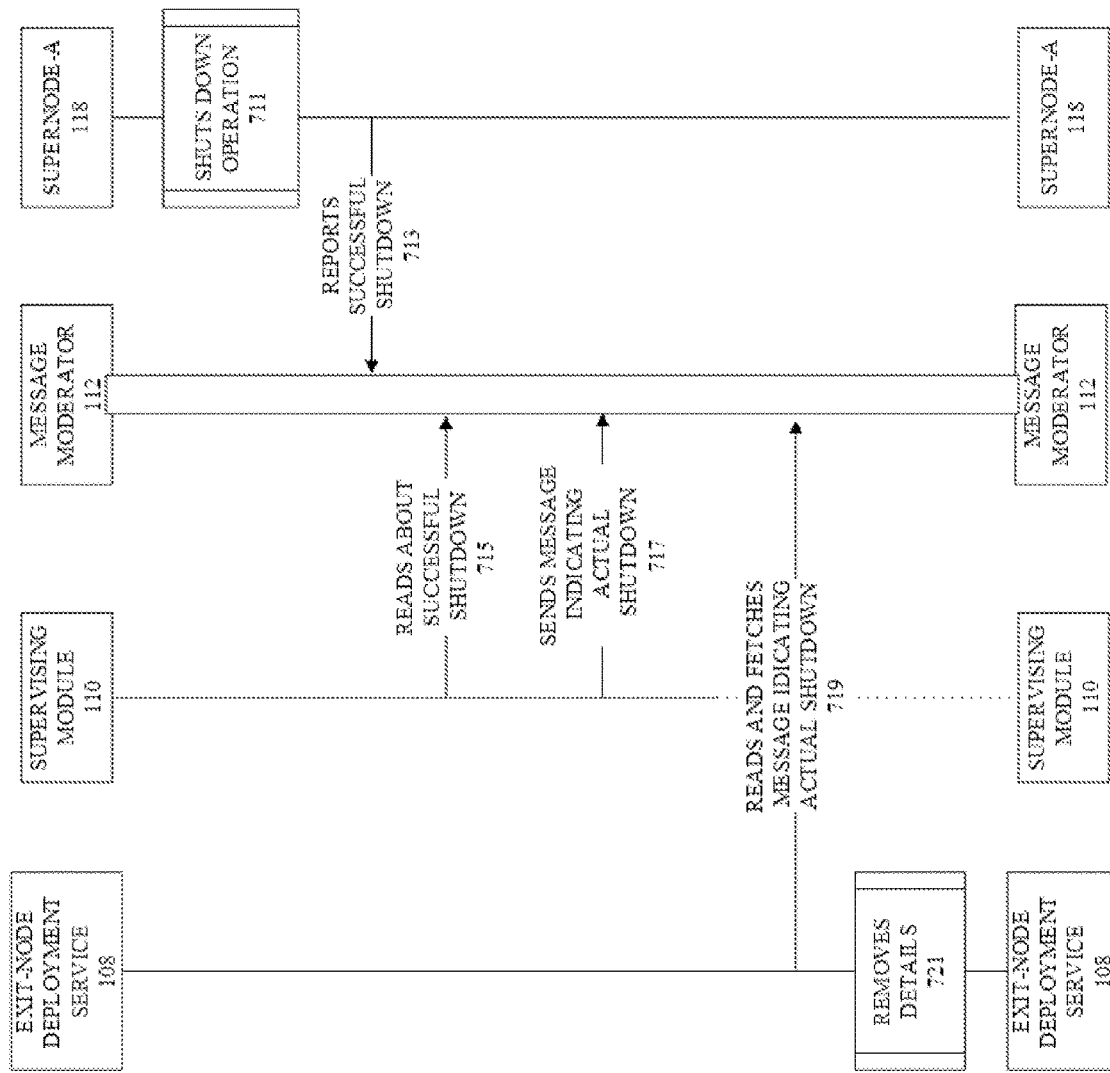

FIGS. 7A-7B is an exemplary sequence diagram showing the steps occurring during a shutdown of one of the plurality of supernodes connected to exit-node 116.

Figure 8:
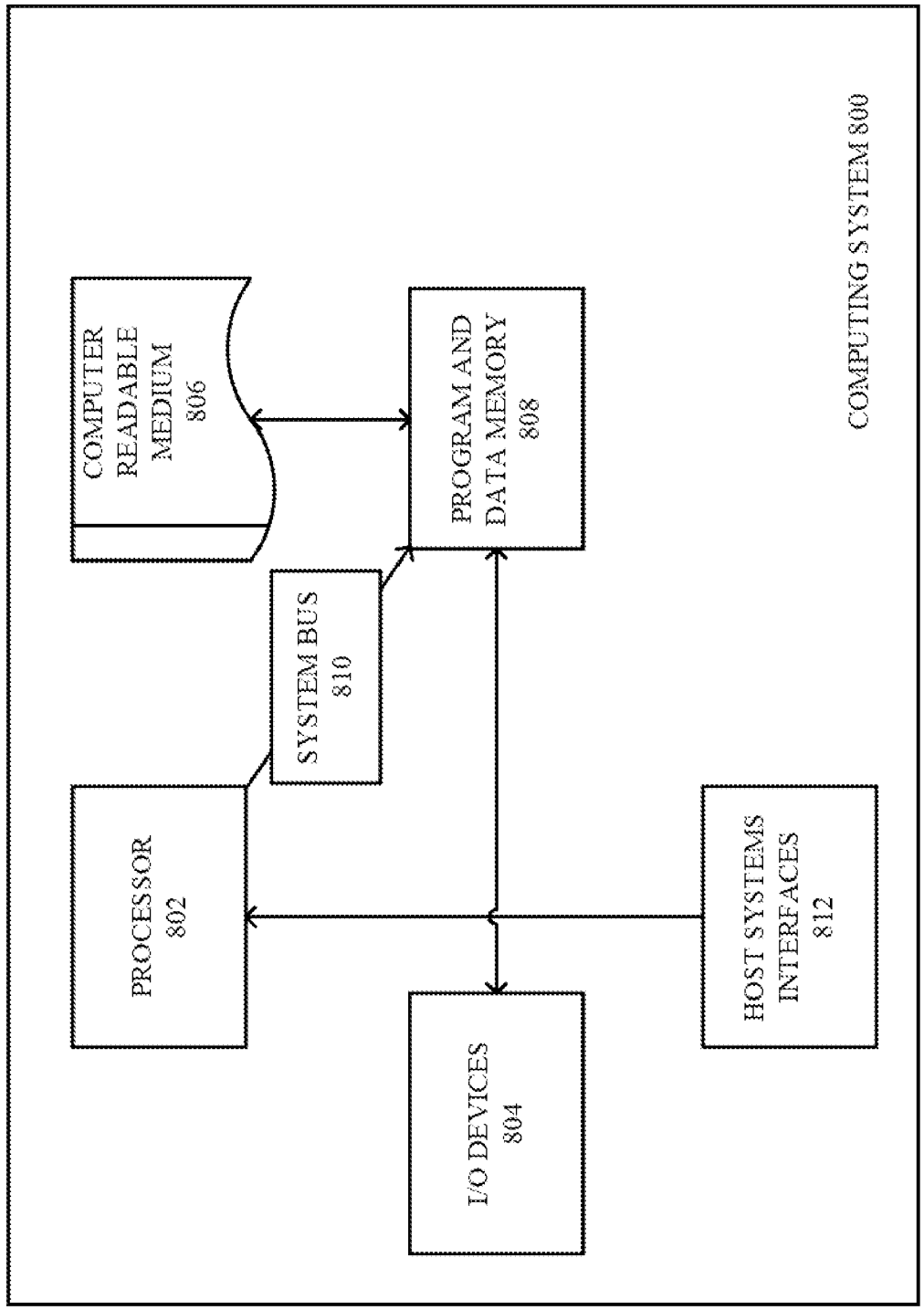

FIG. 8 shows a block diagram of an exemplary computing system.

DETAILED DESCRIPTION

The following detailed description is provided below along with accompanying figures to illustrate the main aspects of the embodiments disclosed herein. While one or more aspects of the embodiments are described, it should be understood that the described aspects are not limited to any one embodiment. On the contrary, the scope of the present embodiments are only limited by the claims and furthermore, the disclosed embodiments may encompass numerous alternatives, modifications and equivalents. For the purpose of example, several details are described in the following description in order to give a comprehensive understanding of the present embodiments. A person of ordinary skills in the art will understand that the described embodiments may be implemented or practiced according to the claims without some or all of these specific details. In addition, standard or well-known methods, procedures, components and/or systems have not been described in detail so as not to obscure the crucial parts of the disclosed exemplary embodiments.

Some general terminology descriptions may be helpful and are included herein for convenience and are intended to be interpreted in the broadest possible interpretation. Elements or entities that are not imperatively defined in the description should have the meaning as would be understood by a person skilled in the art.

In the embodiments of the current disclosure, client device 102 may be any computing resources or any computing architecture including, but not limited to, a computer device, a personal computer, a laptop computer, a smartphone, a tablet computer, an E-reader, a gaming device, a digital camcorder, a handheld gaming device, a digital camera, a wifi speaker, a vehicle infotainment device, an intelligent appliance (e.g., smart refrigerator or smart television), a cloud server, a mainframe, a storage device, a desktop, a workstation, a mobile device, a virtual assistance device, an intelligent printer, or any other electronic device used for requesting resources and/or services from one or more targets over a network. In some instances, the client device 102 may send resources and/or services to one or more targets over a network. Besides, a person having ordinary skill in the art will understand that the term "client" is being used in the interest of brevity and may refer to any of a variety of entities that may be associated with a subscriber account such as, for example, a person, an organization, an organizational role within an organization and/or a group within an organization. In some embodiments, client device 102 may be a part of the same entity that provides proxy services (i.e., service provider instance 104).

Service provider instance 104 (SPI 104) can be a combination of resources and/or elements comprising the environment/infrastructure that offers proxy services to one or more client devices 102. Service provider instance 104 may form a single integrated environment or a distributed infrastructure across multiple geo-location. In some instances, SPI 104 may also be based on, for example, cloud computing environments. One or more clients (i.e., owners or operators or administrators of client devices 102) may either subscribe or purchase proxy services offered by the service provider instance 104. In the current exemplary embodiments, service provider instance 104 may comprise, among other things, proxy agent 106, exit-node deployment service 108, supervising module 110, message moderator 112 and multiple instances of supernodes (i.e., supernode A 118, supernode B 120, . . . , supernode N 122). The number of supernodes present in the service provider instance 104 is not limited and may be determined by the administrator or the owner of the service provider instance 104. Likewise, a person of ordinary skills in the art will understand that service provider instance 104 may comprise several other elements and/or resources or a combination of elements/resources necessary to offer proxy services to one or more client devices 102.

Proxy agent 106 is an element of the service provider instance 104 and, among other things, may be responsible for providing a communication interface between one or more client devices 102 and the elements and/or resources of the SPI 104. Furthermore, proxy agent 106 may be responsible for receiving and forwarding web requests from one or more client devices 102 to the appropriate supernode(s) (such as supernode A 118 or supernode B 120 or supernode N 122). Moreover, proxy agent 106 may also be responsible for forwarding the response data from supernode(s) to the right one or more client devices 102. In addition, proxy agent 104 may be responsible for generating and transmitting a request seeking one or more exit-nodes to exit-node deployment service 108 in order to execute web requests originating from client devices 102.

Exit-node deployment service 108 (EDS 108) is also an element of the service provider instance 104 and can be any computing architecture or facility responsible for reading, fetching, processing, arranging and saving multiple exit-node metadata and messages from message moderator 112. The exit-node metadata and messages are saved in a memory or stored in a storage facility that, in some instances, may be available within the infrastructure of EDS 108 or may be coupled or connected to EDS 108 externally. Furthermore, EDS 108 may organize or group exit-nodes metadata based on various attribute types such as, for example, but not limited to availability level, average response latency, geo-location and network-load capacity. In addition to or on top of arranging or grouping the exit-node metadata according to attribute types, EDS 108 may receive requests from proxy agent 106 seeking one or more exit-nodes to execute web requests originating from one or more client devices 102. EDS 18 may also evaluate, analyze and select one or more exit-nodes deemed suitable for executing specific web requests based on the plurality of exit-node metadata from a memory or storage facility. EDS 108 may also transmit the metadata of the selected exit-node to proxy agent 106. In some instances, EDS 108 may also remove, delete or archive one or more exit-node metadata from the aforesaid memory or storage facility that may be available within the infrastructure of EDS 108 or may be coupled/connected to EDS 108 externally.

Supervising module 110 can be any computing entity or a platform that provides resource distribution and management functionalities in addition to or on top of computing, reading, fetching, storing, processing and communicating vast amounts of data. In current exemplary embodiments, supervising module 110 is a part of the service provider instance 104. Among several responsibilities, supervising module 110 may be responsible for reading, fetching, organizing and transmitting multiple messages from message moderator 112. Supervising module 110 may compile or put together one or more exit-node metadata by using the information available within multiple messages fetched from message moderator 112. After compiling or putting together one or more exit-node metadata, supervising module 110 may also transmit the one or more exit-node metadata to message moderator 112. In some instances, supervising module 110 may generate or compose diagnostic requests intended for one or more exit-nodes. Particularly, supervising module 110 may send the generated or composed diagnostic requests to exit-nodes via multiple supernodes.

Message moderator 112 can be any computing infrastructure providing a scalable and durable environment capable of continuously ingesting gigabytes of data or messages per second from various elements of the SPI 104. The data or messages are then made available in milliseconds for several other elements of SPI 104 that can read, fetch and react to the data or messages present in message moderator 112. Message moderator 112 may allow several elements of SPI to work contemporaneously in a real-time, decoupled and scalable manner. In simple terms, message moderator 112 may offer a middleware service to the several elements of SPI 104. Message moderator 112 may comprise, among other things, a plurality of internal segments or partitions reserved for multiple types of data feeds or messages.

Supernodes (supernode-A 118, supernode-B 120, . . . , supernode-N 122) can be any proxy computing system or a proxy arrangement capable of managing connections and communications with multiple instances of exit-nodes. In the embodiments disclosed herein, supernodes are part of SPI 104, and the number of supernodes are limitless and can be determined by the owner or the administrator of the SPI 104. Supernodes may receive one or more web requests (originated from one or more client device 102) from proxy agent 106 and forward the same to appropriate exit-nodes via network 114. Further, supernodes may receive response data from one or more exit-nodes and forward the same to proxy agent 106. In addition, supernodes may transmit messages to message moderator 112. In some embodiments, supernodes may be configured to ping and/or send diagnostic requests to exit-nodes. Furthermore, in some embodiments, supernodes may be a distributed proxy server environment present within or in combination with the SPI 104.

Exit-node 116 can be any instance of a proxy system or a computing system responsible for communicating and accessing a plurality of targets (such as a remote server or a web server) to receive and send data and/or services. For instance, exit-node 116 can be but is not limited to a laptop, a mobile phone, a desktop computing device, a smart device or any other device capable of network connectivity. In addition, exit-node 116 can be any device or appliances capable of network connectivity but not primarily intended for networking, such as, but not limited to, intelligent home appliances, smart home security systems, autonomous farming equipment, wearable health monitors, smart factory equipment, wireless inventory trackers, biometric cybersecurity scanners, smart shipping containers, and others. A person of ordinary skills in the art will understand that exit-nodes 116 may be distributed and located in different geolocations.

In the present embodiments, a single instance of an exit-node 116 can, at all times, be connected to a plurality of supernodes or at least two supernodes. Due to the aforementioned arrangement, exit-nodes 116 may receive one or more web requests (originated from one or more client devices 102) from any one of the plurality of supernodes. Further, exit-nodes 116 may execute the received web request(s) against target(s) and may return the response data to a different supernode in the plurality of supernodes. That is, exit-node 116 returns the response data to a supernode that is different from the supernode that forwarded the web request(s). The details pertaining to the above-described data exchange will be discussed in detail in the later sections.

Employing at least two different supernodes to route network traffic in a proxy environment can increase high availability, which in turn improves the proxy environment's ability to handle different network loads and failures with minimal or zero downtime. In addition, the methods and systems described in the current embodiments can facilitate the optimization of supernodes to route network traffic to and from exit-nodes 116. Further, the current embodiments, ensures speed and reliability in processing clients' requests thereby offering better proxy services.

Target 124 can be an instance of a server serving resources or other services (e.g., media contents, data, educational information etc.) over the network 114. Target can be identified and accessed by, for example, a particular IP address, a domain name, and/or hostname, possibly with a defined network protocol port. Target 124 may be a remote system serving data or services accessible through standard network protocols. Also, Target 124 may be a physical or a cloud server.

Network 114 can be any digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

Figure 1:
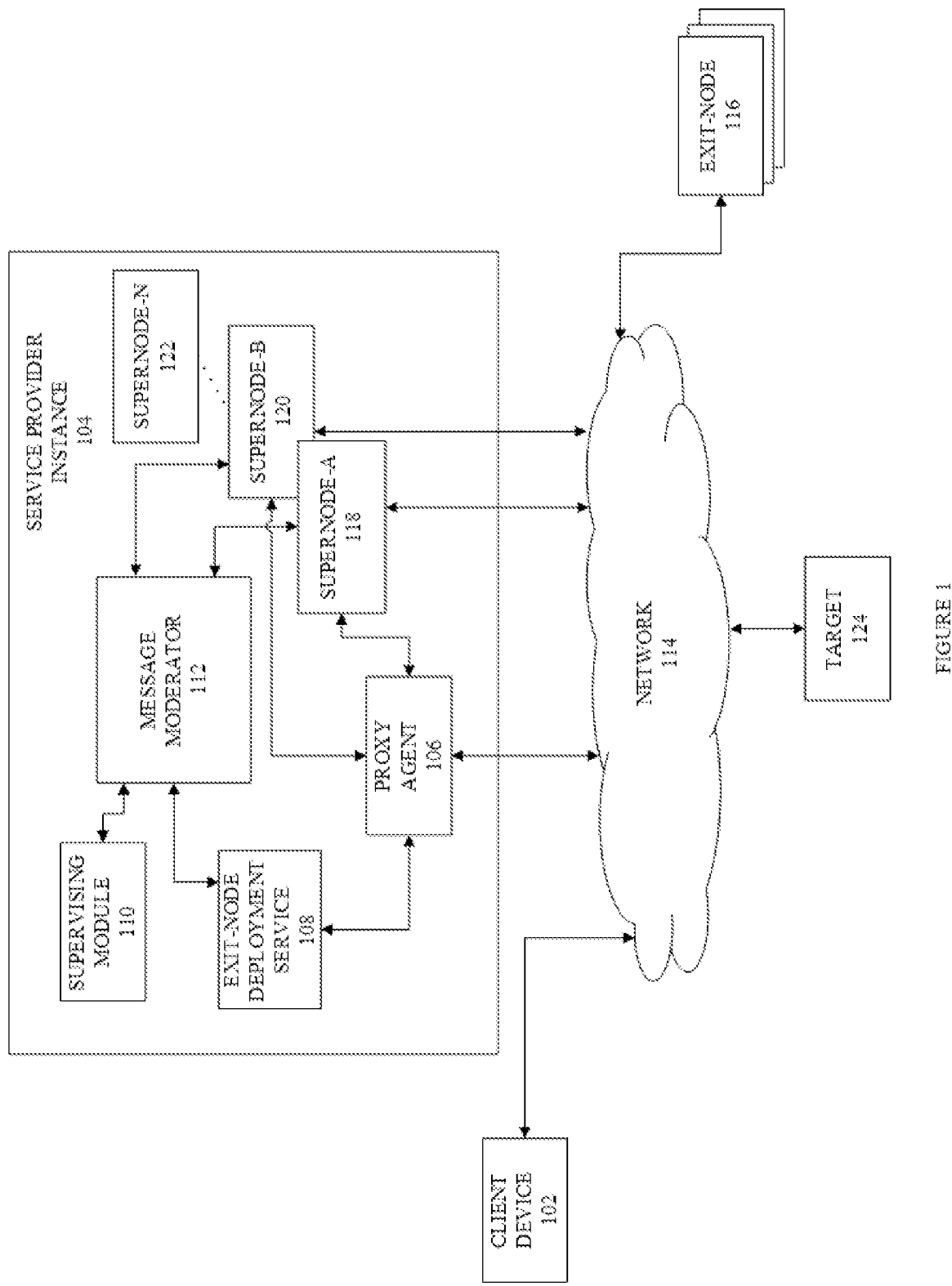
FIG. 1 shows a block diagram of an exemplary proxy service architecture in which the elements of the embodiments described herein are applicable.

FIG. 1 shows a block diagram of an exemplary proxy service architecture in which the elements of the embodiments described herein are applicable. FIG. 1 shows a single instance of client device 102, service provider infrastructure 104, exit-nodes 116, a single instance of target 124 and network 112. A person of ordinary skills in the art will understand that in actuality, there can be a plurality of client devices 102 approaching or communicating with one or more service providers instance 104 via network 114. In FIG. 1, SPI 104 comprises, among other elements, proxy agent 106, exit-node deployment service 108, supervising module 110, message moderator 112 and a collection of supernodes (supernode A 118, supernode B 120, . . . , supernode N 122). It must be understood that service provider instance 104 may comprise other resources and/or elements/entities (not shown or described) necessary to offer proxy service to one or more client devices 102. Within the SPI 104, exit-node deployment service 108, supervising module 110 and supernodes can access message moderator 112. Likewise, supernodes, proxy agent 106, can have access to network 114. Furthermore, proxy agent 106 can communicate with EDS 108 and supernodes.

While the elements shown in FIG. 1 implement an exemplary embodiment, some elements in other embodiments can have different titles or be combined into single elements instead of two separate elements. However, the functionality of the elements and the flow of information between the elements are not impacted by such combinations or consolidations. Therefore, FIG. 1, as shown, should be interpreted as exemplary only and not restrictive or exclusionary of other elements or features. In addition, network 114 can be local area networks (LANs), wide-area networks (WANs), campus-area networks (CANs), metropolitan-area networks (MANs), home-area networks (HANs), Intranet, Extranet, Internetwork, Internet. However, the Internet is the most relevant network for the functioning of the present embodiment. Connections to network 114 may require that client device 102, proxy agent 106, supernodes execute software routines that support the implementation of, for example, TCP/IP communications.

Referring to FIG. 1, in one exemplary embodiment, a single instance of exit-node 116 may approach SPI 104 and initiate a connection with a plurality of supernodes (e.g., supernode-A 118, supernode-B 120, . . . , supernode-N 122) via network 114. The number of supernodes to which an instance of exit-node 116 may approach to initiate connections is limitless and may be determined by the owner/administrator of SPI 104. Typically, in the current disclosure, a single instance of exit-node 116 may initiate connections with multiple or at least two supernodes at any given instance. Exit-node 116 may initiate a connection with a plurality of supernodes by, for example, transmitting a signal or a connection request to each of the plurality of supernodes sequentially or concurrently. Supernodes may listen or receive the transmitted signals or requests from exit-node 116 and confirm the connection with exit-node 116. In addition, exit-node 116 may transmit message(s) reporting the connection status to each supernode of the plurality of supernodes.

After connecting with a plurality of supernodes, in some instances, exit-node 116 may, for the sake of convenience, regard the connected supernodes as belonging to two main clusters (e.g., cluster 1 and cluster 2) within its system or computing architecture. In another instance, supernodes may be already grouped into two or more clusters by SPI 104. In the exemplary block diagram of FIG. 1, exit-node 116 is shown as connected to two supernodes, namely supernode-A 118 and supernode-B 120. However, a person with ordinary skill in the art will appreciate that in actuality, exit-node 116 may be connected to a plurality of supernodes or at least two supernodes at any given instance.

Concerning FIG. 1, in another exemplary embodiment, one of the plurality of supernodes connected to exit-node 116 may, in certain instances, be configured to ping exit-node 116 in order to test and verify specific attributes of exit-node 116. In the current example, supernode-A 118 may send ping packets to exit-node 116 via network 114 to test and verify attributes such as but not limited to IP address of exit-node 116, the ability of exit-node 116 to accept requests, active status of exit-node 116, round-trip time of response message and latency. Right after sending the ping packets to exit-node 116, supernode-A 118 may send a message reporting the transmission of ping packets along with a timestamp and other parameters such as but not limited to the ID of exit-node 116 to message moderator 112. Consequently, supervising module 110 may fetch the aforesaid message reporting the transmission of ping packets along with the timestamp and other parameters from message moderator 112. Supervising module 110 may save the aforesaid message reporting the transmission of ping packets along with the timestamp and other parameters within its memory.

In response to the ping packets, exit-node 116 may return a reply known as pong packets to a different supernode among the plurality of supernodes connected to exit-node 116. In the present example, exit-node 116 may return pong packets to supernode-B 120 instead of returning the aforesaid pong packets to supernode-A 118. Right after receiving the pong packets from exit-node 116, supernode-B 120 may send a message reporting the reception of the pong packets from exit-node 116 along with a timestamp and other parameters such as but not limited to the ID of exit-node 116 to message moderator 112. Consequently, supervising module 110 may fetch the aforementioned message reporting the reception of the pong packets from exit-node 116 along with the timestamp and other parameters from message moderator 112. Supervising module 110 may save the aforesaid message reporting the reception of the pong packets along with the timestamp and other parameters within its memory. Additionally, here, the term 'ID of exit-node 116' may refer to a unique identifier object that identifies a particular exit-node. ID of exit-node 116 can be, for example, alphanumeric expressions.

Referring again to FIG. 1, in another exemplary embodiment, supervising module 110 may send a diagnostic request to exit-node 116 via one of the plurality of supernodes connected to exit-node 116. In the disclosed example, supervising module 110 may send a diagnostic request to exit-node 116 via supernode-A 118. The diagnostic request may be, in some instances, a request to obtain data from any specific target (represented by target 124) or to send data to a specific target. The type of data and the target may be decided by SPI 104. Furthermore, supervising module 110 may send the diagnostic request to exit-node 116 via supernode-A 118 to assess, for example, the performance of exit-node 116, the ability of exit-node 116 to reach or access a target via network 114, active status of exit-node 116, the network-load capacity of exit-node 116 and the latency of exit-node 116.

Accordingly, supernode-A 118 may receive the diagnostic request from supervising module 110 and may forward the aforementioned diagnostic request to exit-node 116 via network 114. Exit-node 116 may execute the diagnostic request against a specific target (represented by target 124) and obtain necessary diagnostic response data from the specific target. Consequently, exit-node 116 may forward the diagnostic response data to supervising module 110 via a different supernode among the plurality of supernodes connected to exit-node 116. In the present example, exit-node 116 may forward the diagnostic response data to supervising module 110 via supernode-B 120. Thus, supernode-B 1280 may receive the aforementioned diagnostic response data from exit-node 116 and may forward the same to supervising module 110. After receiving the diagnostic response data, supervising module 110 may save the aforesaid diagnostic response data within its memory. A person of ordinary skill in the art will understand that the diagnostic response data may be accompanied by, for example, the ID of exit-node 116.

Concerning FIG. 1, in another exemplary embodiment, supervising module 110 may compile or put together multiple exit-node metadata and send the same to message moderator 112. In the current example, supervising module 110 may compile metadata of exit-node 116 by extracting, examining and analyzing information from messages and diagnostic response data that were previously saved within the memory of supervising module 110 (for example, message reporting the transmission of ping packets and message reporting the reception of pong packets). The compiled metadata of exit-node 116 may, for instance, comprise but is not limited to the IP address of exit-node 116, the ID of exit-node 116, connected supernodes' details, geo-location of exit-node 116, active status of exit-node 116, the latency of exit-node 116, operating platform information, and network-load capacity of exit-node 116. To summarize, exit-node metadata may comprise several attributes of a particular exit-node. FIG. 1 is only exemplary; therefore, in the actual implementation of the current embodiments, supervising module 110 may compile or put together metadata of multiple exit-nodes and send the same to message moderator 112.

After compiling or putting together the exit-node metadata, supervising module 110 may send the compiled exit-node metadata to message moderator 112. In the current example, supervising module 110 may send the metadata of exit-node 116 to message moderator 110. Subsequently, EDS 108 may fetch the metadata of exit-node 116 from message moderator 112 and save the aforesaid metadata of exit-node 116 in a memory or a storage facility that is either available within the infrastructure of EDS 108 or connected externally. In the current example, EDS 108 is shown fetching the metadata of exit-node 116 from message moderator 112; however, in actuality, EDS 108 may fetch multiple exit-node metadata from message moderator 112. In such instances, EDS 108 may organize or group exit-node metadata into categories based on attribute types such as, for example, latency, geo-location and network-load capacity.

Referring again to FIG. 1, in another exemplary embodiment, client device 102 may approach service provider instance 104 via network 114 and send a web request to proxy agent 106 present within SPI 104. Client device 102 may send the aforesaid web request to acquire data or resources, or services from a specific target such as target 124. Alternatively, in some instances, the aforesaid web request may also be sent to communicate data, resources, or services to a specific target, such as target 124. Moreover, the aforesaid web request may be communicated to proxy agent 106 by using any standard network communication protocols such as, for example, but not limited to HTTP, HTTPS, SOCKS and UDP. In some instances, the web request may be coupled with, for example, but not limited to authentication credentials and request parameters.

Upon receiving the web request, proxy agent 106 may formulate a request seeking a suitable exit-node from exit-node deployment service 108. Specifically, proxy agent 106 may formulate a request seeking a suitable exit-node that may, for example, satisfy the request parameters (originated from client device 102) and/or be suitable for servicing the particular web request. Consecutively, proxy agent 106 may send the formulated request to EDS 108.

EDS 108 receives the formulated request from proxy agent 106 and may select a suitable exit-node (represented by exit-node 116) by analyzing exit-node metadata previously saved in a memory or a storage facility. Subsequently, EDS 108 may select one of the exit-node metadata deemed to be suitable for executing the particular web request and may send the selected exit-node metadata to proxy agent 106. In the current example, EDS 108 may select the metadata of exit-node 116 and may send the same to proxy agent 106.

After obtaining the metadata of exit-node 116, proxy agent 106 may forward the web request (received from the client device 102) to a specific supernode among the plurality of supernodes connected to exit-node 116 and capable of forwarding the web request to exit-node 116. In the exemplary block diagram of FIG. 1, proxy agent 106 may forward the web request to supernode-A 118. Subsequently, supernode-A 118 may forward the web request to exit-node 116 via network 114. Upon receiving the web request from supernode-A 118, exit-node 116 may execute the web request against target 124 and receive response data from target 124. Thereafter, exit-node 116 may forward the response data to a different supernode (i.e., supernode-B 120) among the plurality of supernodes connected to exit-node 116. It must be recalled that exit-node 116 may maintain connections with multiple or at least two exit-node 116 at any given instance. Subsequently, supernode-B 120 may forward the response data to proxy agent 106, which in turn forwards the response data to client device 102 via network 114.

Referring again to FIG. 1, in another exemplary embodiment, one of the plurality of supernodes connected to exit-node 116 may receive instruction and/or signal to shutdown its operations. The instruction and/or signal to shutdown may be sent by the administrator/owner of SPI 104. In the current example, supernode-A 118 may receive the instruction and/or signal to shutdown. Following which, supernode-A 118 may prepare for shutdown and send a message reporting the imminent shutdown to message moderator 112. Supervising module 110 may fetch the message reporting the imminent shutdown of supernode-A 118 from message moderator 112. Subsequently, supervising module 110 may send a 'stop' message to message moderator 112. The purpose of the aforementioned stop message is to inform EDS 108 about the imminent shutdown of supernode-A 118. EDS 108 may fetch the stop message from message moderator 112 and accordingly, EDS 108 may direct proxy agent 108 not to send any more web requests to supernode-A 118.

Although supernode-A 118 prepared to shutdown, exit-node 116 may continue to execute web request(s) received from supernode-A 118 against the target 124. Regardless of the shutdown of supernode-A 118, the routing of the response data to client device 102 is unaffected. Exit-node 116 may return the response data to a different supernode (i.e., supernode-B 120) among the plurality of supernodes connected to exit-node 116. After a certain period, supernode-A 118 may finally shut down its operations entirely and send a message reporting successful shutdown to message moderator 112.

Supervising module 110 may fetch the message reporting the successful shutdown of supernode-A 118 from message moderator 112. Subsequently, supervising module 110 may send a message indicating the actual shutdown of supernode-A 118 to message moderator 112. The purpose of the message indicating the actual shutdown of supernode-A 118 is to inform EDS 108 that supernode-A 118 is no longer available for operations. EDS 108 may fetch the message indicating the actual shutdown of supernode-A 118 from message moderator 112. Further, EDS 108 may react to the aforementioned message by removing the details of supernode-A 118 from the memory or storage facility that is either available within the infrastructure of EDS 108 or connected to EDS 108 externally.

Figure 2B:
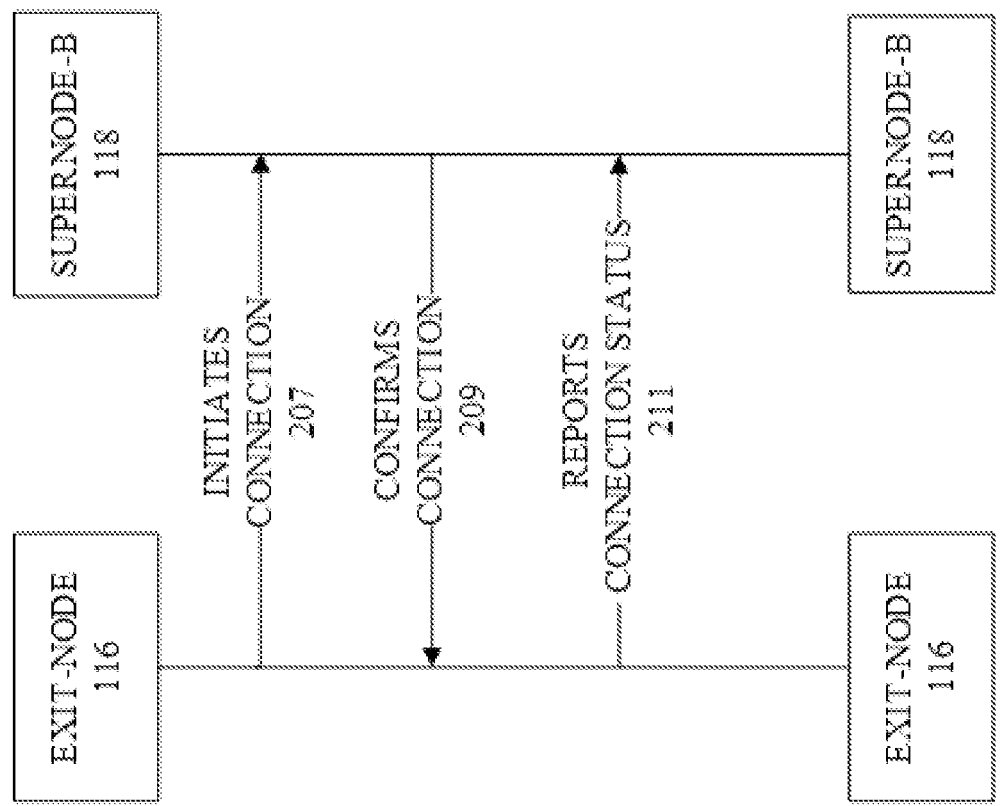

FIGS. 2A-2B is an exemplary sequence diagram showing exit-node 116 connecting with multiple supernodes. In step 201, exit-node 116 approaches SPI 104 and initiates a connection with supernode-A 118 via network 114. Exit-node 116 may initiate a connection with supernode-A 118 by, for example, transmitting a signal or a connection request to supernode-A 118 via network 114. In step 203, supernode-A 118 reacts to the aforesaid initiation and confirms the connection with exit-node 116. Subsequently, in step 205, exit-node 116 sends a message reporting the connection status to supernode-A 118.

Likewise, exit-node 116 proceeds to connect with a different supernode, i.e., supernode-B 120 present within SPI 104. Therefore, in step 207, exit-node 116 approaches SPI 104 and initiates a connection with supernode-B 120 via network 114. Exit-node 116 may initiate a connection with supernode-B 120 by, for example, transmitting a signal or a connection request to supernode-B 120 via network 114. In step 209, supernode-B 120 reacts to the aforesaid initiation and confirms the connection with exit-node 116. Subsequently, in step 211, exit-node 116 sends a message reporting the connection status to supernode-B 120.

A person of ordinary skills in the art must understand that FIGS. 2A-2B are only exemplary. In actuality, exit-node 116 may connect to multiple supernodes available within SPI 104. Also, exit-node 116 may initiate connection with multiple supernodes concurrently, therefore, steps 201-205 and steps 207-211 may occur simultaneously.

Figure 3A:
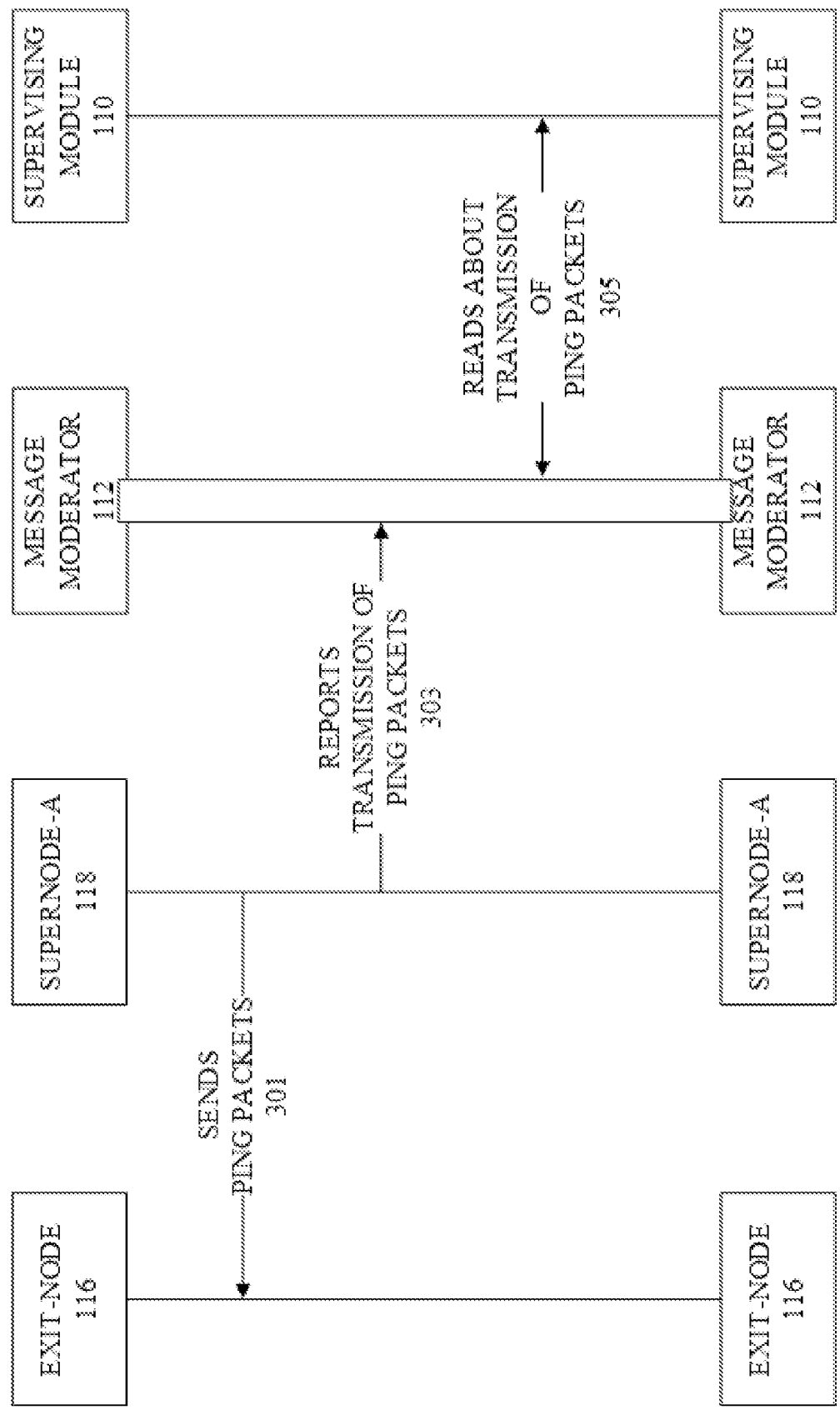
FIGS. 3A-3B is an exemplary sequence diagram showing one of the plurality of supernodes connected to exit-node 116 sending ping packets to exit-node 116.
Figure 3B:
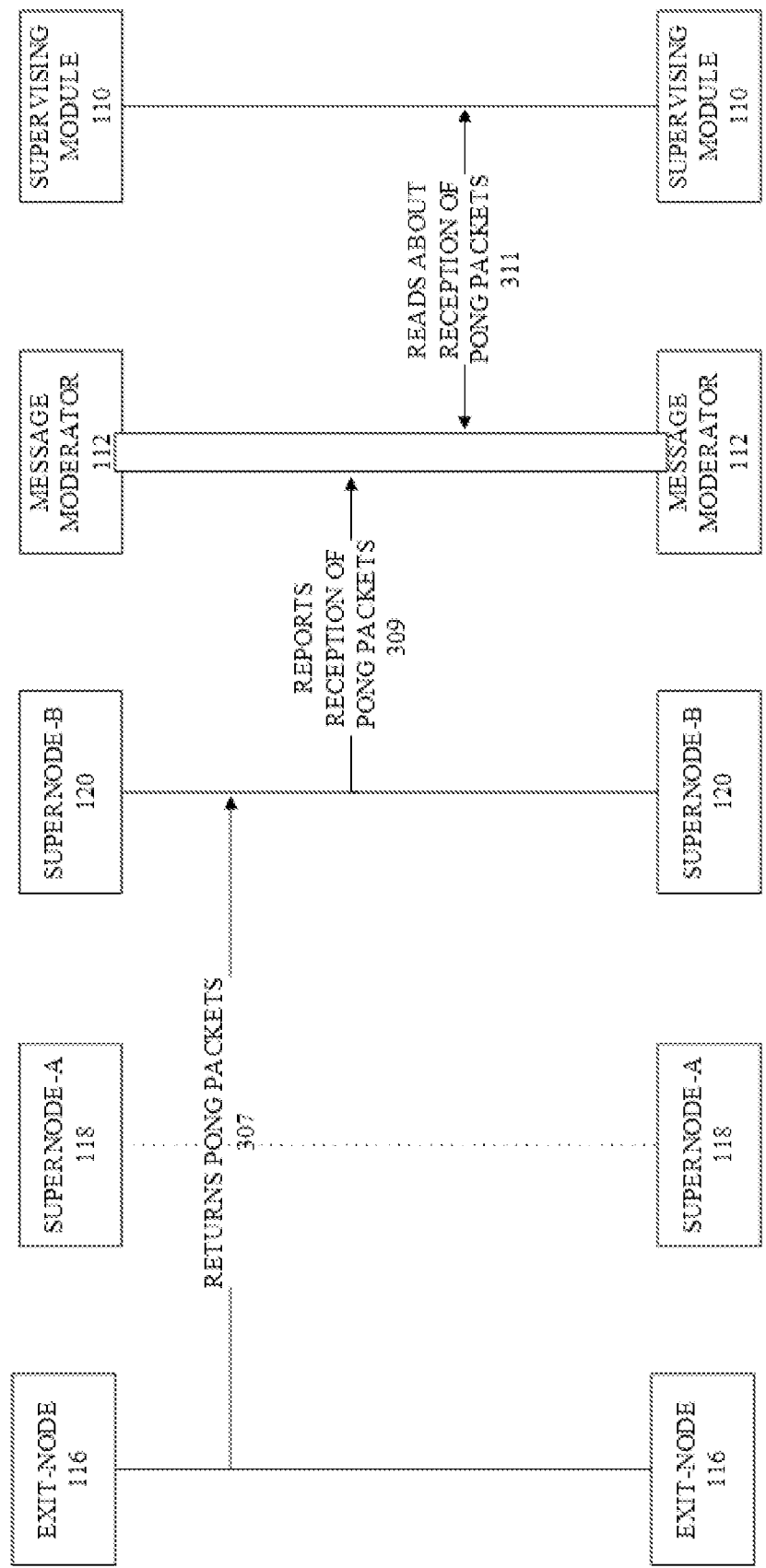

FIGS. 3A-3B is an exemplary sequence diagram showing one of the plurality of supernodes connected to exit-node 116 sending ping packets to exit-node 116. AS previously mentioned, one of the plurality of supernodes connected to exit-node 116 may, in certain instances, be configured to ping exit-node 116 to test and verify specific attributes of exit-node 116. Therefore, in step 301, supernode-A 118 sends ping packets to exit-node 116 via network 114. Supernode-A 118 may send ping packets to exit-node 116 via network 114 to test and verify attributes such as but not limited to IP address of exit-node 116, the ability of exit-node 116 to accept requests, active status of exit-node 116, round-trip time of response message and latency.

Right after sending the ping packets to exit-node 116, supernode-A 118 may send a message reporting the transmission of ping packets along with a timestamp and other parameters such as but not limited to the ID of exit-node 116 to message moderator 112.

Subsequently, in step 303, supernode-A 118 sends a message reporting the transmission of ping packets along with a timestamp and other parameters such as but not limited to the ID of exit-node 116 to message moderator 112. In step 305, supervising module 110 reads and fetches the message reporting the transmission of ping packets along with the timestamp and other parameters such as but not limited to ID of exit-node 116 from message moderator 112. Supervising module 110 saves the aforesaid message within its memory.

In response to the ping packets sent by supernode-A 118, exit-node 116 returns a reply known as pong packets to a different supernode among the plurality of supernodes connected to exit-node 116. Therefore, in step 307, exit-node 116 returns pong packets to supernode-B 120 via network 114. Subsequently, in step 309, supernode-B 120 sends a message reporting the reception of pong packets along with time, timestamp and other attributes such as but not limited to the ID of exit-node 116 to message moderator 112. In step 311, supervising module 110 reads and fetches the message reporting the reception of pong packets along with a time-stamp and other attributes such as but not limited to ID of exit-node 116 from message moderator 112. Supervising modules 110 saves the aforesaid message within its memory.

FIGS. 4A-4B is an exemplary sequence diagram showing supervising module 110 sending a diagnostic request to exit-node 116 via one of the supernodes among the plurality of supernodes connected to exit-node 116. In the current exemplary sequence diagram, supervising module 110 composes and sends diagnostic requests to exit-node 116 via supernode-A 118. Therefore, in step 401, supervising module 110 sends the diagnostic request to supernode-A 118. In step 403, supernode-A 118 receives the diagnostic request from supervising module 110, and in step 405, supernode-A forwards the diagnostic request to exit-node 116 via network 114.

Subsequently, in step 407, exit-node 116 receives the diagnostic request, and in step 409, exit-node 116 executes the diagnostic request against target 124. After which, in step 411, exit-node 116 receives diagnostic response data from target 124 via network 114. Consecutively, exit-node 116 forwards the diagnostic response data to a different supernode among the plurality of supernodes connected to exit-node 116. Therefore, in step 413, exit-node 116 forwards the diagnostic response data to supernode-B 120 via network 114. In step 415, supernode-B 120 receives the diagnostic response data and in step 417, forwards the diagnostic response data to supervising module 110. In step 419, the supervising module 110 receives the diagnostic response data and saves the same within its memory.

The diagnostic request may be, in some instances, a request to obtain data from any specific target (represented by target 124) or to send data to a specific target. The type of data and the target may be decided by SPI 104. The purpose of the diagnostic request is to asses, for example, the performance of exit-node 116, the ability of exit-node 116 to reach or access a target via network 114, active status of exit-node 116, the network-load capacity of exit-node 116 and the latency of exit-node 116.

FIG. 5 is an exemplary sequence diagram showing supervising module 110 compiling or putting together the metadata of exit-node 116 and sending the metadata of exit-node 116 to message moderator 112. In step 501, supervising module 110 compiles or puts together the metadata of exit-node 116 by extracting, examining and analyzing information from messages and diagnostic response data that were previously saved within the memory of supervising module 110 (for example, message reporting the transmission of ping packets and message reporting the reception of pong packets). The compiled metadata of exit-node 116 may, for instance, comprise but is not limited to the IP address of exit-node 116, the ID of exit-node 116, connected supernodes' details, geo-location of exit-node 116, active status of exit-node 116, the latency of exit-node 116, operating platform information, and network-load capacity of exit-node 116. To summarize, exit-node metadata may comprise several attributes of a particular exit-node.

After compiling or putting together the metadata of exit-node 116, the supervising module 110 in step 503, sends the metadata of exit-node 116 to message moderator 112. In step 505, EDS 108 reads and fetches the metadata of exit-node 116 from message moderator 112. In step 507, EDS 108 saves the fetched metadata of exit-node 116 with a memory or a storage facility. The aforementioned memory or the storage facility may be available within the infrastructure of EDS 108 or may be coupled or connected to EDS 108 externally.

FIG. 5 is only an exemplary sequence diagram; however, in actuality, supervising module 110 may compile and send multiple exit-node metadata to message moderator 112. Likewise, EDS 108 may also read and fetch multiple exit-node metadata from message moderator 112. In such instances, EDS 108 may organize or group exit-node metadata into categories based on attribute types such as, for example, latency, geo-location and network-load capacity.

FIGS. 6A-6C is an exemplary sequence diagram showing the execution of a web request received from client device 102. In step 601, client device 102 sends a web request to proxy agent 106 via network 114. Client device 102 sends the web request to obtain data or resources or services from target 124. However, in some embodiments, client device 102 may also send a web request to communicate data or resources or services to target 124. Further, the web request is coupled with, for example, but is not limited to authentication credentials and request parameters.

In step 603, proxy agent 106 receives the web request from client device 102, and in step 605, proxy agent 106 requests a suitable exit-node for executing the web request from EDS 108. Subsequently, in step 607, EDS 108 selects a suitable exit-node (represented by exit-node 116) by analyzing the multiple exit-node metadata previously stored in a memory or a storage facility. It should be recalled that the aforementioned memory or storage facility may be available within the infrastructure of EDS 108 or may be coupled or connected to EDS 108 externally. In step 609, EDS 108 sends the metadata of the suitable exit-node (i.e., metadata of exit-node 116) to proxy agent 106, and in step 611 proxy agent receives the metadata of the suitable exit-node (i.e., metadata of exit-node 116).

Upon receiving the metadata of exit-node 116, proxy agent 106 forwards the web request to a specific supernode among the plurality of supernodes connected to exit-node 116 and capable of forwarding the web request to exit-node 116. Accordingly, in step 613, proxy agent 106 forwards the web request to supernode-A 118. In step 615, supernode-A 118 receives the web request from proxy agent 106 and in the subsequent step, i.e., in step 617, forwards the web request to exit-node 116 via network 114. In step 619, exit-node 116 receives the web request from supernode-A 118 and proceeds to execute the web request against the target (in step 621). As a result, in step 623, exit-node 116 receives response data from target 124. After receiving the response data from target 124, exit-node 116 forwards the response data to a different supernode among the plurality of supernodes connected to exit-node 116. Therefore, in step 625, exit-node 116 forwards the response data to supernode-B 120 via network 114. In step 627, supernode-B 120 receives the response data from exit-node 116, and in step 629, forwards the response data to proxy agent 106. After receiving the response data from supernode-B 120 in step 631, proxy agent 106 forwards the response data to the client device 102 (step 633) via network 114.

FIGS. 7A-7B is an exemplary sequence diagram showing the steps occurring during a shutdown of one of the plurality of supernodes connected to exit-node 116. In certain instances of the embodiments disclosed herein, one of the plurality of supernodes connected to exit-node 116 can shutdown after receiving instruction and/or signal to shutdown from the administrator/owner of SPI 104. FIGS. 7A-7B is an exemplary sequence diagram wherein supernode-A 118 receives the instruction and/or signal to shutdown (shown in step 701). In step 703, supernode-A 118 prepares to shutdown and sends a message reporting the imminent shutdown to message moderator 112. In step 705, supervising module 110 reads and fetches the message reporting the imminent shutdown of supernode-A 118 from message moderator 112. Subsequently, in step 707, supervising module 110 sends a 'stop' message to message moderator 112. The purpose of the aforementioned stop message is to inform EDS 108 about the imminent shutdown of supernode-A 118. Therefore, in step 709, EDS reads and fetches the stop message from message moderator 112. After which, EDS 108 will direct proxy agent 106 not to send any more web requests to supernode-A 118.

Although supernode-A 118 prepared to shutdown, exit-node 116 continues to execute web request(s) received from supernode-A 118 against the target 124. Regardless of the shutdown of supernode-A 118, the routing of the response data to client device 102 is unaffected. Exit-node 116 may return the response data to a different supernode (i.e., supernode-B 120) among the plurality of supernodes connected to exit-node 116. After a certain period of time, in step 711, supernode-A 118 finally shuts down its operations completely and sends a message reporting successful shutdown to message moderator 112 (step 713).

In step 715, supervising reads and fetches the message reporting the successful shutdown of supernode-A 118 from message moderator 112. Subsequently, in step 717, supervising module 110 sends a message indicating the actual shutdown of supernode-A 118 to message moderator 112. The purpose of the message indicating the actual shutdown of supernode-A 118 is to inform EDS 108 that supernode-A 118 is no longer available for operations. In step 719, EDS 108 reads and fetches the message indicating the actual shutdown of supernode-A 118 from message moderator 112. In step 721, EDS 108 reacts to the aforementioned message by removing the details of supernode-A 118 from the memory or storage facility that is either available within its infrastructure or connected externally.

The embodiments herein may be combined or collocated in a variety of alternative ways due to design choice. Accordingly, the features and aspects herein are not in any way intended to be limited to any particular embodiment. Furthermore, one must be aware that the embodiments can take the form of hardware, firmware, software, and/or combinations thereof. In one embodiment, such software includes but is not limited to firmware, resident software, microcode, etc. FIG. 8 illustrates a computing system 800 in which a computer-readable medium 803 may provide instruction for performing any methods and processes disclosed herein.

Furthermore, some aspects of the embodiments herein can take the form of a computer program product accessible from the computer-readable medium 806 to provide program code for use by or in connection with a computer or any instruction execution system. For the purposes of this description, the computer-readable medium 806 can be any apparatus that can tangibly store the program code for use by or in connection with the instruction execution system, apparatus, or device, including the computing system 800.

The computer-readable medium 806 can be any tangible electronic, magnetic, optical, electromagnetic, infrared, or semiconductor system (or apparatus or device). Some examples of a computer-readable medium 806 include solid-state memories, magnetic tapes, removable computer diskettes, random access memories (RAM), read-only memories (ROM), magnetic disks, and optical disks. Some examples of optical disks include read-only compact disks (CD-ROM), read/write compact disks (CD-R/W), and digital versatile disks (DVD).

The computing system 800 can include one or more processors 802 coupled directly or indirectly to memory 808 through a system bus 810. The memory 908 can include local memory employed during actual execution of the program code, bulk storage, and/or cache memories, which provide temporary storage of at least some of the program code in order to reduce the number of times the code is retrieved from bulk storage during execution.

Input/output (I/O) devices 804 (including but not limited to keyboards, displays, pointing devices, I/O interfaces, etc.) can be coupled to the computing system 800 either directly or through intervening I/O controllers. Network adapters may also be coupled to the computing system 800 to enable the computing system 800 to couple to other data processing systems, such as through host systems interfaces 812, printers, and/or storage devices through intervening private or public networks. Modems, cable modems, and Ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way but may also be configured in ways that are not listed. For the indication of elements, singular or plural form can be used, but it does not limit the scope of the disclosure and the same teaching can apply to multiple objects, even if in the current application an object is referred to in its singular form.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment.

What is claimed is:

1. A method for efficiently routing network traffic within a proxy environment, comprising:
   receiving, by a proxy agent, a web request from a client device, wherein the web request specifies a target;
   formulating, by the proxy agent, a request to identify an exit node suitable to execute the web request from one or more exit nodes in the proxy environment, wherein each exit node of the one or more exit nodes is connected to a plurality of supernodes;
   transmitting, by the proxy agent, the formulated request to an exit node deployment system, wherein the exit node deployment system, upon receiving the formulated request, selects an exit node based on an analysis of metadata for the one or more exit nodes;
   receiving, by the proxy agent, the metadata for the selected exit node from the exit node deployment system;
   identifying, by the proxy agent, a first supernode among the plurality of supernodes for transmitting the web request based on the metadata for the selected exit node;
   transmitting, by the proxy agent, the web request to the selected exit node via the first supernode in the plurality of supernodes connected to the identified exit node, wherein the selected exit node, upon receiving the web request, executes the web request against the target;
   receiving, by the proxy agent, response data from the selected exit node via a second supernode in the plurality of supernodes connected to the selected exit node, the second supernode being a different proxy server from the first supernode;
   forwarding, by the proxy agent, the response data to the client device;
   receiving, by the proxy agent, a stop message indicating that the first supernode has received a shutdown command, wherein the proxy agent is further configured to continue to receive the response data from the selected exit node via the second supernode after receiving the stop message;
   preventing, by the proxy agent, a subsequent request from the client device from being transmitted to the selected exit node via the first supernode based on the stop message;
   detecting, by the exit node deployment system, that the first supernode is shutdown; and
   removing, by the exit node deployment system, details of the first supernode from a memory or storage facility of the exit node deployment system.

2. The method of claim 1, further comprising:
   compiling, by a supervising module, the metadata for the one or more exit nodes, wherein the metadata comprises attributes of the one or more exit nodes; and
   forwarding, by the supervising module, the metadata for the one or more exit nodes to a message moderator.

3. The method of claim 2, wherein the attributes of the one or more exit nodes include at least one of an Internet Protocol (IP) address of the exit node, an identifier (ID) for the exit node, connected supernodes' details, a geolocation of the exit node, a status of the exit node, a latency of the exit node, operating platform information, and network-load capacity of the exit node.

4. The method of claim 2, wherein the compiling the metadata comprises:
generating, by the supervising module, a diagnostic request to test the attributes of the one or more exit nodes;
transmitting, by the supervising module, the diagnostic request to the one or more exit nodes via one supernode among the plurality of supernodes connected to each of the one or more exit nodes;
receiving, by the supervising module, diagnostic response data from the one or more exit nodes via a different supernode among the plurality of supernodes connected to each of the one or more exit nodes;
receiving, by the supervising module, a message from the message moderator, wherein the message indicates the transmission of the diagnostic request and the receipt of the diagnostic response data; and
analyzing, by the supervising module, information in the message and the diagnostic response data.

5. The method of claim 4, wherein the diagnostic request is at least a ping packet, and wherein the diagnostic response data is at least a pong packet.

6. The method of claim 4, wherein the received message from the message moderator includes at least one of a timestamp or an ID of the exit node.

7. The method of claim 2, further comprising:
fetching, by the exit node deployment system, the metadata from the message moderator;
grouping, by the exit node deployment system, the metadata based on one or more attribute types, wherein the one or more attribute types include at least one of an average response latency, a geolocation, and a network-load capacity; and
saving, by the exit node deployment system, the metadata in at least the memory or the storage facility.

8. The method of claim 7, wherein the memory and the storage facility are present within an infrastructure of the exit node deployment system or coupled to the exit node deployment system externally.

9. A non-transitory computer-readable device having instruction stored thereon that, when executed by at least one computing device, cause the at least one computing device to perform operations, the operations comprising:
receiving a web request from a client device, wherein the web request specifies a target;
formulating a request to identify an exit node suitable to execute the web request from one or more exit nodes in a proxy environment, wherein each exit node in the one or more exit nodes is connected to a plurality of supernodes;
transmitting the formulated request to an exit node deployment system, wherein the exit node deployment system, upon receiving the formulated request, selects an exit node based on an analysis of metadata for the one or more exit nodes;
receiving the metadata for the selected exit node from the exit node deployment system;
identifying a first supernode among the plurality of supernodes for transmitting the web request based on the metadata for the selected exit node;
transmitting the web request to the selected exit node via the first supernode in the plurality of supernodes connected to the selected exit node, wherein the selected exit node, upon receiving the web request, executes the web request against the target;
receiving response data from the selected exit node via a second supernode in the plurality of supernodes connected to the selected exit node, the second supernode being a different proxy server from the first supernode;
forwarding the response data to the client device;
receiving a stop message indicating that the first supernode has received a shutdown command, wherein the response data from the selected exit node is received via the second supernode after receiving the stop message;
preventing a subsequent request from the client device from being transmitted to the selected exit node via the first supernode based on the stop message;
detecting that the first supernode is shutdown; and
removing details of the first supernode from a memory or storage facility of the exit node deployment system.

10. The non-transitory computer-readable device of claim 9, the operations further comprising:
compiling, by a supervising module, the metadata for the one or more exit nodes, wherein the metadata comprises attributes of the one or more exit nodes; and
forwarding, by the supervising module, the metadata for the one or more exit nodes to a message moderator.

11. The non-transitory computer-readable device of claim 10, wherein the attributes of the one or more exit nodes include at least one of an Internet Protocol (IP) address of the exit node, an identifier (ID) for the exit node, connected supernodes' details, a geolocation of the exit node, a status of the exit node, a latency of the exit node, operating platform information, and network-load capacity of the exit node.

12. The non-transitory computer-readable device of claim 10, wherein the compiling the metadata comprises:
generating, by the supervising module, a diagnostic request to test the attributes of the exit node;
transmitting, by the supervising module, the diagnostic request to the one or more exit nodes via one supernode among the plurality of supernodes connected to each of the one or more exit nodes;
receiving, by the supervising module, diagnostic response data from the one or more exit nodes via a different supernode among the plurality of supernodes connected to each of the one or more exit nodes;
receiving, by the supervising module, a message from the message moderator, wherein the message indicates the transmission of the diagnostic request and receipt of the diagnostic response data; and
analyzing, by the supervising module, information in the message and the diagnostic response data.

13. The non-transitory computer-readable device of claim 12, wherein the diagnostic request is at least a ping packet, and wherein the diagnostic response data is at least a pong packet.

14. The non-transitory computer-readable device of claim 12, wherein the received message from the message moderator includes at least one of a timestamp or an ID of the exit node.

15. The non-transitory computer-readable device of claim 10, the operations further comprising:
fetching, by the exit node deployment system, the metadata from the message moderator;
grouping, by the exit node deployment system, the metadata based on one or more attribute types, wherein the one or more attribute types include at least one of an average response latency, a geolocation, and a network-load capacity; and saving, by the exit node deployment system, the metadata in at least the memory or the storage facility.

16. A system for efficiently routing network traffic within a proxy environment, comprising:

at least one processor and a memory;

one or more exit nodes, wherein each exit node is connected to a plurality of supernodes and configured to obtain data or services from a plurality of target servers;

a supervising module configured to compile metadata for the one or more exit nodes;

a proxy agent configured to receive a web request specifying a target from a client device, formulate a request seeking a suitable exit node to execute the web request, identify a supernode based on the metadata for the one or more exit nodes, transmit the web request to an identified exit node via the supernode, receive response data from the identified exit node via the supernode, forward the response data to the client device, receive a stop message indicating that the first supernode has received a shutdown command, continue to receive the response data from the identified exit node via a second supernode after receiving the stop message, and prevent a subsequent request from the client device from being transmitted to the identified exit node via the supernode based on the stop message; and an exit node deployment system configured to select an exit node from the one or more exit nodes to execute the web request based on an analysis of the metadata for the one or more exit nodes, detect that the first supernode is shutdown, and remove details of the first supernode from a memory or storage facility of the exit node deployment system.

17. The system of claim 16, wherein the metadata comprises attributes of the one or more exit nodes, and wherein the attributes of the one or more exit nodes include at least one of an Internet Protocol (IP) address of the exit node, an identifier (ID) for the exit node, connected supernodes' details, a geolocation of the exit node, a status of the exit node, a latency of the exit node, operating platform information, and network-load capacity of the exit node.

18. The system of claim 16, wherein the supervising module is further configured to generate a diagnostic request to verify attributes of the one or more exit nodes, transmit the diagnostic request to the one or more exit nodes, receive diagnostic response data from the one or more exit nodes, receive, from a message moderator, a message indicating the transmission of the diagnostic request and receipt of the diagnostic response data, and analyze information in the message and the diagnostic response data.

19. The system of claim 18, wherein the diagnostic request is at least a ping packet, and wherein the diagnostic response data is at least a pong packet.

20. The system of claim 16, wherein the exit node deployment system is further configured to group the metadata based on one or more attribute types, wherein the one or more attribute types include at least one of an average response latency, a geolocation, and a network-load capacity.

* * * * *